United States Patent
Guo et al.

(10) Patent No.: US 12,122,703 B2
(45) Date of Patent: Oct. 22, 2024

(54) STRESS PROFILES OF GLASS-BASED ARTICLES HAVING IMPROVED DROP PERFORMANCE

(71) Applicant: CORNING INCORPORATED, Corning, NY (US)

(72) Inventors: Xiaoju Guo, Pittsford, NY (US); Jason Thomas Harris, Horseheads, NY (US); Kevin Barry Reiman, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 98 days.

(21) Appl. No.: 17/480,394

(22) Filed: Sep. 21, 2021

(65) Prior Publication Data
US 2022/0098091 A1 Mar. 31, 2022

Related U.S. Application Data

(60) Provisional application No. 63/083,267, filed on Sep. 25, 2020.

(51) Int. Cl.
| | | |
|---|---|---|
| *C03C 21/00* | (2006.01) | |
| *C03C 3/097* | (2006.01) | |
| *C03C 10/00* | (2006.01) | |

(52) U.S. Cl.
CPC .......... *C03C 10/0027* (2013.01); *C03C 3/097* (2013.01); *C03C 21/002* (2013.01); *C03C 2201/50* (2013.01); *C03C 2204/00* (2013.01)

(58) Field of Classification Search
CPC ..... C03C 21/00–002; C03C 3/083–091; Y10T 428/315
See application file for complete search history.

(56) References Cited

U.S. PATENT DOCUMENTS

| | | |
|---|---|---|
| 8,312,739 B2 | 11/2012 | Lee et al. |
| 8,561,429 B2 | 10/2013 | Allan et al. |

(Continued)

FOREIGN PATENT DOCUMENTS

| | | | | |
|---|---|---|---|---|
| WO | WO-2018056168 A1 | * | 3/2018 | ............ C03C 21/00 |
| WO | 2019/194110 A1 | | 10/2019 | |

(Continued)

OTHER PUBLICATIONS

Lecture on First and Second Derivatives from Dartmouth; https://math.dartmouth.edu/opencalc2/cole/lecture8.pdf (Year: 1998).*

(Continued)

*Primary Examiner* — Z. Jim Yang

(57) ABSTRACT

Glass-based articles comprise stress profiles providing improved drop performance. A glass-based substrate comprises: a glass transition temperature ($T_g$), a liquid fragility index (m), and fictive temperature ($T_f$), wherein $T_g$ is less than or equal to 650° C., a value of $T_f$ minus $T_g$ is greater than or equal to −30° C., and m is greater than or equal to 25. A stress relaxation rate is greater than or equal to 10%, or 20% or more. The articles can comprise a lithium-based aluminosilicate composition and a fracture toughness that is greater than or equal to 0.75 MPa*m$^{0.5}$. The stress profiles comprise: a spike region extending from the first surface to a knee; and a tail region extending from the knee to a center of the glass-based article, the tail region comprising: a negative curvature region wherein a second derivative of stress as a function of depth is negative; a depth of compression (DOC) that is greater than or equal to 0.22t, and a parabolic region originating at the DOC and extending to the center of the glass-based article.

11 Claims, 15 Drawing Sheets

(56) References Cited

U.S. PATENT DOCUMENTS

| | | | |
|---|---|---|---|
| 8,666,705 B2 | 3/2014 | Allan et al. | |
| 8,854,623 B2 | 10/2014 | Fontaine et al. | |
| 10,633,279 B2 | 4/2020 | Gross et al. | |
| 10,906,834 B2 | 2/2021 | Gross et al. | |
| 2010/0009154 A1* | 1/2010 | Allan | C03C 3/093 501/67 |
| 2012/0321898 A1* | 12/2012 | Meinhardt | C03C 21/002 428/410 |
| 2013/0224492 A1* | 8/2013 | Bookbinder | C03C 21/002 65/30.14 |
| 2017/0076024 A1* | 3/2017 | Allan | C03B 1/00 |
| 2017/0158556 A1* | 6/2017 | Dejneka | G06F 1/1637 |
| 2017/0197870 A1* | 7/2017 | Finkeldey | C03C 4/18 |
| 2017/0251086 A1* | 8/2017 | Gagne-Keats | B22F 5/00 |
| 2018/0105461 A1* | 4/2018 | Schneider | C03C 17/30 |
| 2018/0194670 A1* | 7/2018 | Gross | G06F 1/1626 |
| 2018/0222790 A1* | 8/2018 | Fotheringham | C03C 3/091 |
| 2018/0251400 A1* | 9/2018 | Bookbinder | C03C 3/097 |
| 2019/0127265 A1* | 5/2019 | Dejneka | G06F 1/1626 |
| 2019/0263713 A1* | 8/2019 | Murayama | C03B 23/0302 |
| 2019/0300422 A1* | 10/2019 | Guo | G02F 1/133308 |
| 2019/0367408 A1* | 12/2019 | Harris | C03C 17/006 |
| 2019/0375679 A1* | 12/2019 | Gross | C03C 21/002 |
| 2020/0109083 A1* | 4/2020 | Imakita | C03C 3/091 |
| 2020/0156993 A1* | 5/2020 | Kinoshita | C03C 21/002 |
| 2020/0223750 A1 | 7/2020 | Dejneka et al. | |
| 2020/0325066 A1* | 10/2020 | Murayama | C03C 3/078 |
| 2020/0377408 A1* | 12/2020 | Kim | G06F 1/1637 |
| 2021/0009462 A1* | 1/2021 | Murayama | C03C 3/087 |
| 2021/0024405 A1* | 1/2021 | Yu | C03C 10/0027 |
| 2021/0061705 A1* | 3/2021 | Jin | C03C 3/093 |
| 2021/0130231 A1* | 5/2021 | Schneider | H05K 5/03 |
| 2021/0292225 A1* | 9/2021 | Umada | C03C 3/093 |
| 2021/0292226 A1* | 9/2021 | Umada | C03C 3/091 |
| 2021/0323862 A1* | 10/2021 | Kanehara | C03C 4/14 |
| 2021/0371332 A1* | 12/2021 | Ichimaru | C03C 3/085 |
| 2021/0387904 A1* | 12/2021 | Ichimaru | C03C 21/002 |
| 2022/0041493 A1* | 2/2022 | Yuki | C03C 3/091 |
| 2022/0048809 A1* | 2/2022 | Umada | C03C 3/095 |
| 2022/0055348 A1* | 2/2022 | Xiao | B32B 7/12 |
| 2022/0289625 A1* | 9/2022 | Kanehara | C03C 3/085 |
| 2022/0371942 A1* | 11/2022 | Ping | C03C 3/093 |
| 2023/0112685 A1* | 4/2023 | Maeda | C03C 3/085 501/63 |

FOREIGN PATENT DOCUMENTS

| | | | | |
|---|---|---|---|---|
| WO | WO-2020075708 A1 * | 4/2020 | | C03C 21/002 |
| WO | WO-2020129578 A1 * | 6/2020 | | |
| WO | WO-2020149236 A1 * | 7/2020 | | C03C 21/002 |

OTHER PUBLICATIONS

International Search Report and Written Opinion of the International Searching Authority; PCT/US2021/049348; dated Jan. 13, 2022; 12 pages; European Patent Office.

"Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992),".

"Reddy, K. P. R. et al, "Fracture Toughness Measurement of Glass and Ceramic Materials Using Chevron-Notched Specimens," J. Am. Ceram. Soc., 71 [6], C-310-C-313 (1988)".

ASTM C-965-96 (2017) "Standard Practice for Measuring Viscosity of Glass Above the Softening Point".

ASTM C1350M-96(2019) "Standard Test Method for Measurement of Viscosity of Glass Between Softening Point and Annealing Range (Approximately 108 Pas to Approximately 1013 Pas) by Beam Bending".

ASTM C1351M-96(2017) "Standard Test Method for Measurement of Viscosity of Glass Between 104 Pas and 108 Pas by Viscous Compression of a Solid Right Cylinder".

ASTM standard C770-16, entitled "Standard Test Method for Measurement of Glass Stress-Optical Coefficient,".

Guo et al. "Unified approach for determining enthalpic fictive temperature of glasses with arbitrary thermal history." Journal of Non-Crystalline solids, vol. 357, 2011, pp. 3230-3236.

Guo et al., "Predictive model for the composition dependence of glassy dynamics", J. Am. Ceram. Soc. 2018, vol. 101, pp. 1169-1179.

Mauro et al., "Nonequilibrium viscosity of glass", Phys. Rev. B 80, 094204 (2009).

Mauro, John C., et al., "Fictive Temperature and the Glassy State", Journal of the American Ceramic Society-Mauro et al., vol. 92, No. 1, Jan. 2009, pp. 75-86.

Potuzak et al., "Topological origin of stretched exponential relaxation in glass", J. of Chem. Phys. 135, 2011, 214502.

Shyam, A. and Lara-Curzio, E., "The double-torsion testing technique for determination of fracture toughness and slow crack growth of materials: A review," J. Mater. Sci., 41, 2006, pp. 4093-4104.

\* cited by examiner

STRESS PROFILES OF GLASS-BASED ARTICLES HAVING IMPROVED DROP PERFORMANCE

This application claims the benefit of priority under 35 U.S.C. § 119 of U.S. Provisional Application Ser. No. 63/083,267 filed on Sep. 25, 2020, the content of which is relied upon and incorporated herein by reference in its entirety.

BACKGROUND

Field

The present specification generally relates to stress profiles of glass-based articles suitable for use as cover glass for electronic devices. More particularly, the specification relates to improved stress profiles and methods of providing lithium-containing aluminosilicate glasses with improved drop performance.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, such as asphalt, granite, etc., can result in sharp indentations in the glass surface. These indentations become failure sites in the glass surface from which cracks may develop and propagate.

Chemical treatment is a strengthening method to impart a desired and/or engineered stress profile having one or more of the following parameters: compressive stress (CS), depth of compression (DOC), and maximum central tension (CT). Many glass-based articles, including those with engineered stress profiles, have a compressive stress that is highest or at a peak at the glass surface and reduces from a peak value moving away from the surface, and there is zero stress at some interior location of the glass article before the stress in the glass article becomes tensile. Chemical strengthening by ion exchange (IOX) of alkali-containing glass is a proven methodology in this field.

Glass-based articles, specifically glasses, can be made more resistant to flexure failure by traditional ion-exchange techniques, which can involve inducing compressive stress in the glass surface. However, the ion-exchanged glass can still be vulnerable to dynamic sharp contact, owing to the high stress concentration caused by local indentations in the glass from the sharp contact.

It has been a continuous effort for glass makers and handheld device manufacturers to improve the resistance of handheld devices to sharp contact failure. Solutions range from coatings on the cover glass to bezels that prevent the cover glass from impacting the hard surface directly when the device drops on the hard surface. However, due to the constraints of aesthetic and functional requirements, it is very difficult to completely prevent the cover glass from impacting the hard surface.

There is a need for improved stress profiles that result in excellent drop performance.

SUMMARY

Aspects of the disclosure pertain to glass-based articles and methods for their manufacture.

In an aspect, a glass-based article comprises: a composition comprising a lithium-based aluminosilicate and a fracture toughness that is greater than or equal to 0.75 MPa*m$^{0.5}$; opposing first and second surfaces defining a thickness (t); and a stress profile comprising: a spike region extending from the first surface to a knee; and a tail region extending from the knee to a center of the glass-based article, the tail region comprising: a negative curvature region wherein a second derivative of stress as a function of depth is negative; a depth of compression (DOC) that is greater than or equal to 0.22t, and a parabolic region originating at the DOC and extending to the center of the glass-based article In an embodiment, the composition at a center of the glass-based article comprises a lithium oxide ($Li_2O$) content of greater than 8 mol %. In an embodiment, the composition at a center of the glass-based article comprises a molar ratio of sodium oxide ($Na_2O$) to lithium oxide ($Li_2O$) of less than 1.0. In an embodiment, the molar ratio of sodium oxide ($Na_2O$) to lithium oxide ($Li_2O$) is less than or equal to 0.63. In an embodiment, the lithium-based aluminosilicate composition comprises potassium oxide ($K_2O$) and phosphorus pentoxide ($P_2O_5$) in an amount that is less than 2 mol % of the composition. In an embodiment, the negative curvature region comprises an average compressive stress (CS) of greater than or equal to 50 MPa to less than or equal to 120 MPa.

In an embodiment, the composition at a center of the glass-based article comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$.

In an embodiment, the stress profile further comprises: a maximum compressive stress ($CS_{max}$) of greater than or equal to 150 MPa.

In an embodiment, the stress profile further comprises: a value of a peak central tension (CT)*thickness (t) in the parabolic region in the range of greater than or equal to 80 MPa to less than or equal to 160 MPa.

In an embodiment, the t is in the range of greater than or equal to 0.02 millimeters and less than or equal to 2 millimeters.

In an embodiment, the glass-based article further comprises an alkali metal present in a non-zero varying concentration extending from the first and/or second surface of the glass-based article to a depth of the glass-based article. In an embodiment, the alkali metal is selected from the group consisting of: potassium (K), sodium (Na), lithium (Li), rubidium (Rb), cesium (Cs), francium (Fr), and combinations thereof.

In an embodiment, the glass-based article further comprises a retained strength of greater than or equal to 170 MPa as measured for an article having a thickness of 600.0 μm after impact with 30 grit sandpaper with a force of 470.0 N.

In an embodiment, the glass-based article further comprises a retained strength of greater than or equal to 170 MPa as measured for an article having a thickness of 600.0 μm after impact with 80 grit sandpaper with a force of 470.0 N.

In an aspect, a glass-based article comprises: opposing first and second surfaces defining a thickness (t); and a first retained strength of greater than or equal to 170 MPa as measured for an article having a thickness of 600.0 μm after impact with 30 grit sandpaper with a force of 470.0 N, and a second retained strength of greater than or equal to 170 MPa as measured for an article having a thickness of 600.0 μm after impact with 80 grit sandpaper with a force of 470.0 N.

In an embodiment, the first retained strength and the second retained strength are ±5 MPa. In an embodiment, the glass-based article comprises: a composition comprising a lithium-based aluminosilicate and a fracture toughness that is greater than or equal to 0.75 MPa*m$^{0.5}$. In an embodiment, the glass-based article comprises: a stress profile comprising: a spike region extending from the first surface to a knee; and a tail region extending from the knee to a center of the glass-based article, wherein the tail region comprises: a negative curvature region wherein a second derivative of stress as a function of depth is negative; a depth of compression (DOC) that is greater than or equal to 0.22t, and a parabolic region originating at the DOC and extending to the center of the glass-based article.

A further aspect is a consumer electronic product comprising: a housing having a front surface, a back surface, and side surfaces; electrical components provided at least partially within the housing, the electrical components including at least a controller, a memory, and a display, the display being provided at or adjacent the front surface of the housing; and a cover disposed over the display; wherein a portion of at least one of the housing and the cover comprises the glass-based article of any aspect or embodiment herein.

Another aspect is a method of manufacturing a glass-based article comprising: exposing a glass-based substrate having opposing first and second surfaces defining a substrate thickness (t) and a lithium-based aluminosilicate composition to an ion exchange treatment comprising: a first molten salt bath and a second molten salt bath to form the glass-based article; wherein the glass-based article comprises: a fracture toughness that is greater than or equal to 0.75 MPa*m$^{0.5}$; and a stress profile comprising: a spike region extending from the first surface to a knee; and a tail region extending from the knee to a center of the glass-based article, the tail region comprising: a negative curvature region wherein a second derivative of stress as a function of depth is negative; a depth of compression (DOC) that is greater than or equal to 0.22t, and a parabolic region originating at the DOC and extending to the center of the glass-based article.

In an embodiment, the method further comprises an annealing step after the ion exchange treatment.

In an embodiment, the lithium-based aluminosilicate composition comprises a lithium oxide ($Li_2O$) content of greater than 8 mol %. In an embodiment, the composition at a center of the glass-based article comprises a molar ratio of sodium oxide ($Na_2O$) to lithium oxide ($Li_2O$) of less than 1.0. In an embodiment, the molar ratio of sodium oxide ($Na_2O$) to lithium oxide ($Li_2O$) is less than or equal to 0.63. In an embodiment, the lithium-based aluminosilicate composition comprises potassium oxide ($K_2O$) and phosphorus pentoxide ($P_2O_5$) in an amount that is less than 2 mol % of the composition. In an embodiment, the negative curvature region comprises an average compressive stress (CS) of greater than or equal to 50 MPa to less than or equal to 120 MPa. In an embodiment, the composition comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$. In an embodiment, the stress profile further comprises: a maximum compressive stress ($CS_{max}$) of greater than or equal to 150 MPa.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The accompanying figures, which are incorporated in and constitute a part of this specification, illustrate several embodiments described below.

DETAILED DESCRIPTION

Figure 1:
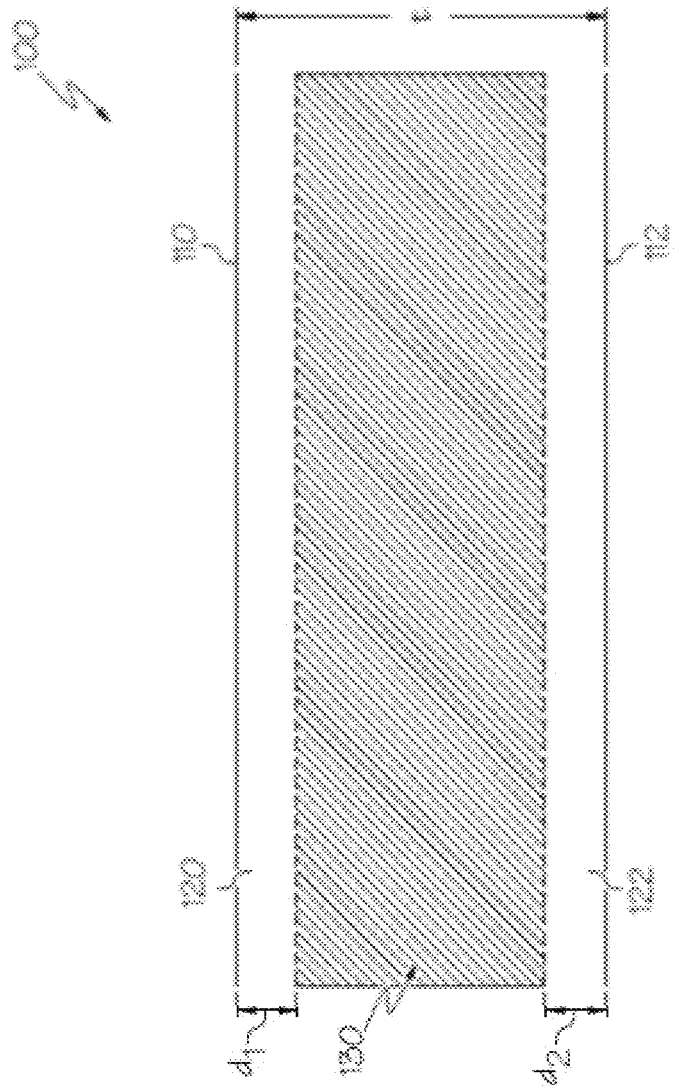
FIG. 1 schematically depicts a cross-section of a glass having compressive stress layers on surfaces thereof according to embodiments disclosed and described herein.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment, or to only one embodiment. Furthermore, the particular features, structures, materials, or characteristics may be combined in any suitable manner in one or more embodiments.

Definitions and Measurement Techniques

The terms "glass-based article" and "glass-based substrates" are used to include any object made wholly or partly of glass, such as glass or glass-ceramic materials. Laminated glass-based articles include laminates of glass and non-glass materials, laminates of glass and crystalline materials.

A "base composition" is a chemical make-up of a substrate prior to any ion exchange (IOX) treatment. That is, the base composition is undoped by any ions from IOX. A composition at the center of a glass-based article that has been IOX treated is typically the same as the base composition when IOX treatment conditions are such that ions supplied for IOX do not diffuse into the center of the substrate. In one or more embodiments, a central composition at the center of the glass article comprises the base composition.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

Unless otherwise specified, all compositions described herein are expressed in terms of mole percent (mol %) on an oxide basis.

A "stress profile" is stress as a function of thickness across a glass-based article. A compressive stress region extends from a first surface to a depth of compression (DOC) of the article, and is a region where the article is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, positive values of stress are compressive stress (CS), which are expressed as a positive or absolute value—i.e., as recited herein, CS=|CS|. Additionally, negative values of stress are tensile stress. But when used with the term "tensile", stress or central tension (CT) may be expressed as a positive value, i.e., CT=|CT|. Central tension (CT) refers to tensile stress in a central region or a central tension region of the glass-based article. Maximum central tension (maximum CT or $CT_{max}$) may occur in the central tension region, such as nominally at 0.5·t, where t is the article thickness, which allows for variation from exact center of the location of the maximum tensile stress. Peak tension (PT) refers to maximum tension measured, which may or may not be at the center of the article.

A "knee" of a stress profile is a depth of an article where the slope of the stress profile transitions from steep to gradual. The knee may refer to a transition area over a span of depths where the slope is changing. The knee stress $CS_k$ is defined as the value of compressive stress that the deeper portion of the CS profile extrapolates to at the depth of spike ($DOL_k$). The $DOL_k$ is reported as measured by a surface-stress meter by known methods. A schematic representation of a stress profile including a knee stress is provided in FIG. 2.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, as determined by Glow Discharge—Optical Emission Spectroscopy (GD-OES)). In some embodiments, the DOL is given as the depth of exchange of the slowest-diffusing or largest ion introduced by an ion exchange (IOX) process. DOL with respect to potassium ($DOL_K$) is the depth at which the potassium content of the glass article reaches the potassium content of the underlying substrate. DOL with respect to sodium ($DOL_{Na}$) is the depth at which the sodium content of the glass article reaches the sodium content of the underlying substrate.

Unless otherwise specified, CT and CS are expressed herein in megaPascals (MPa), thickness is express in millimeters and DOC and DOL are expressed in microns (micrometers).

Compressive stress (including surface/peak CS, $CS_{max}$) and $DOL_{sp}$ are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum central tension (CT) or peak tension (PT) and stress retention values are measured using a scattered light polariscope (SCALP) technique known in the art. The Refracted near-field (RNF) method or SCALP may be used to measure the stress profile and the depth of compression (DOC). When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Fracture toughness ($K_{1C}$) represents the ability of a glass composition to resist fracture. Fracture toughness is measured on a non-strengthened glass article, such as measuring the $K_{1C}$ value prior to ion exchange (IOX) treatment of the glass article, thereby representing a feature of a glass substrate prior to IOX. The fracture toughness test methods described herein are not suitable for glasses that have been exposed to IOX treatment. But, fracture toughness measurements performed as described herein on the same glass prior to IOX treatment (e.g., glass substrates) correlate to fracture toughness after IOX treatment, and are accordingly used as such. The chevron notched short bar (CNSB) method utilized to measure the $K_{1C}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). The double torsion method and fixture utilized to measure the $K_{1C}$ value is described in Shyam, A. and Lara-Curzio, E., "The double-torsion testing technique for determination of fracture toughness and slow crack growth of materials: A review," J. Mater. Sci., 41, pp. 4093-4104, (2006). The double torsion measurement method generally produces $K_{1C}$ values that are slightly higher than the chevron notched short bar method. Unless otherwise specified, all fracture toughness values were measured by chevron notched short bar (CNSB) method.

Stress relaxation ratio (SR) of measured relaxed stress ($\sigma_r$) to theoretical unrelaxed stress ($\sigma_o$) in glasses that have been exposed to IOX treatment refers to the ratio of final measured relaxed stress after IOX to theoretical unrelaxed stress that is expected from a stress profile based on ideal conditions for diffusion based on a complementary error function (erfc(x)). A SR has a value of less than 1 to greater than 0. A stress relaxation rate of a substrate or an article is a percentage of reduction of a theoretical unrelaxed stress. For example, for a theoretical unrelaxed stress ($\sigma_o$) of 100 MPa and a measured relaxed stress (Gr) of 90 MPa, the stress relaxation rate is 10%, or 1 minus the SR times 100.

Theoretical unrelaxed stress ($\sigma_o$) is determined based on a measured ion concentration through thickness of an IOX-treated article, which is entered into the following linear elastic equation.

$$\sigma^{\Omega'}(z, T) = \frac{BE}{1-v}[C_{avg}(T) - C(z, T)],$$

where z is location and T is through the thickness of the article, C is concentration, B is linear lattice dilation coefficient, E is Young's modulus, and v is Poisson's ratio. Based on ionic radius of Li+ (0.08 nm), Na+ (0.102 nm), and K+ (0.0138 nm), one mol % percent of Li+4 Na+ IOX causes about 60% growth when compared to one mol % percent of Na+→K+, therefore a value of 0.6 ppk/mol % Li+→Na+ was used for B. For glasses of interest, E is generally in the range of greater than or equal to 60 to less than or equal to 90 GPa; and v is generally greater than or equal to 0.2 to less than or equal to 0.24.

Measured relaxed stress ($\sigma_r$) is determined from a surface stress measurement, excluding any spike or steep surface profile, conducted by, for example, Refractive Near Field (RNF) method.

Molten glass has different structures at different temperatures. This structure may be frozen into a solidified (or solid)

glass, depending on the thermal treatment to which the glass is exposed. As used herein, fictive temperature ($T_f$) of a solid glass is the temperature of a molten glass having a structure that is the same as that of the solid glass. A discussion of fictive temperature can be found in, for example, Mauro, et al., "Fictive Temperature and the Glassy State," J. Am. Ceram. Soc., 2009, 92:75-86, the content of which in its entirety is incorporated herein by reference. In accordance with the present disclosure, the calculation of the fictive temperature associated with the thermal history and glass properties of a particular glass composition can follow established methods. $T_f$ can be determined according to the Guo methodology of "Unified approach for determining enthalpic fictive temperature of glasses with arbitrary thermal history." Journal of Non-Crystalline solids. 357 (2011) 3230-3236 (Guo et al.), the contents of which are incorporated herein by reference in their entirety. The Guo methodology generates first and second upscans of heat capacity versus temperature curves using differential scanning calorimetry at a DSC upscan rate of 10 K/min. The three-step procedure includes: (a) first, calculating fictive temperature of a rejuvenated glass, $T_{f2}$, on the second upscan using area-matching; (b) second, calculating the area between the two DSC upscan curves, which gives the difference between the enthalpies of as-formed ($H_1$) and rejuvenated glasses ($H_2$); and (c) finally, determining the fictive temperature of the as-formed glass, $T_{f1}$, by area-matching using Eq. (A):

$$\int_{T_{f2}}^{T_{f1}} (C_{p\,liquid} - C_{p\,glass}) dT = \int_0^\infty (C_{p2} - C_{p1}) dT. \quad (A)$$

Unless otherwise specified, all $T_f$ values were determined by the Guo methodology.

As used herein, the glass transition temperature ($T_g$) of a material is the temperature at which it has an equilibrium viscosity of $10^{12}$ Pa·s. Unless otherwise specified, all $T_g$ values were determined from a viscosity vs temperature curve generated in accordance with ASTM C1350M—96 (2019) ("Standard Test Method for Measurement of Viscosity of Glass Between Softening Point and Annealing Range (Approximately $10^8$ Pa·s to Approximately $10^{13}$ Pa·s) by Beam Bending").

As used herein, liquid fragility index (m) of a material is a rate of viscosity change as a function of temperature at its glass transition temperature ($T_g$). The liquid fragility index (m) for composition (x) is defined by:

$$m(x) = \left. \frac{\partial \log_{10} \underline{x} \eta_{eq}(T, x)}{\partial (T_g(x)/T)} \right|_{T=Tg(x)}.$$

A viscosity vs temperature curve is generated using one or more viscometers. The value of liquid fragility index (m) is the slope of the log(viscosity) vs 1/T curve at $T=T_g$. Unless otherwise specified, all m values were determined from a viscosity vs temperature curve generated in accordance with the following test methods in combination: ASTM C-965-96 (2017) ("Standard Practice for Measuring Viscosity of Glass Above the Softening Point); STM C1351M—96(2017) ("Standard Test Method for Measurement of Viscosity of Glass Between $10^4$ Pa·s and $10^8$ Pas by Viscous Compression of a Solid Right Cylinder); and ASTM C1350M—96 (2019) ("Standard Test Method for Measurement of Viscosity of Glass Between Softening Point and Annealing Range (Approximately $10^8$ Pa·s to Approximately $10^{13}$ Pa·s) by Beam Bending").

Both the glass transition temperature ($T_g$) for composition x and the composition's fragility can be expressed as expansions which employ empirically-determined fitting coefficients. Such expansions are discussed in detail in co-pending, commonly-assigned U.S. patent application Ser. No. 12/896,355, entitled "METHODS AND APPARATUS FOR PREDICTING GLASS PROPERTIES," which was filed on Oct. 1, 2010, the content of which in its entirety is hereby incorporated herein by reference.

General Overview of Properties of Glass-Based Articles

Glass-based articles herein are designed to have improved drop performance for high damage resistant glasses. Glass-based articles herein are designed with compositions and characteristics to leverage stress relaxation. This results in stress profiles having an S-shape before a depth of compression (DOC) and a parabolic shape after the DOC.

Glass-based substrates are designed herein to achieve the desired S-shape profile over a reasonable ion exchange (IOX) treatment time and below a chosen IOX treatment temperature. In one or more embodiments, the glass stress-based substrates achieve a stress relaxation rate of greater than or equal to 10%, or 20%, or 30%, or 40%, or 50% or 60%, or 70%, or 80% or more. Compositions for suitable glass-based substrates are designed accordingly to comprise a desirable combination of: a glass transition temperature ($T_g$), a liquid fragility index (m), and fictive temperature ($T_f$). In one or more embodiments, for an IOX treatment temperature of less than or equal to 500° C., $T_g$ is less than or equal to 650° C., a value of $T_f$ minus $T_g$ (e.g., the difference between $T_f$ and $T_g$) is greater than or equal to −30° C., and m is greater than or equal to 25.

In one or more embodiments, the articles herein comprise a lithium-based aluminosilicate composition and a fracture toughness that is greater than or equal to 0.75 MPa*$m^{0.5}$. The stress profiles comprise: a spike region extending from the first surface to a knee; and a tail region extending from the knee to a center of the glass-based article, the tail region comprising: a negative curvature region wherein a second derivative of stress as a function of depth is negative; the DOC being greater than or equal to 0.22t, and a parabolic region originating at the DOC and extending to the center of the glass-based article.

Under ideal conditions, shape and values of a stress profile in an ion exchanged glass are expected to obey a classic diffusion equation. The solution for this equation indicates that, in the case of a single boundary through which the ions diffuse without limit, the stress profile should be a complementary error function (erfc(x)). As used herein, the terms "error function" and "erf" refer to the function that is twice the integral of a normalized Gaussian function between 0 and x/σ√2. The terms "complementary error function" and "erfc" are equal to one minus the error function; i.e., erfc(x)=1−erf(x). For a bounded case—e.g., where ions diffuse from opposite surfaces to the center of the glass—diffusion of strengthening cations follows a complementary error function until the ions meet at the center of the glass, after which the whole diffusion profile may be better approximated by a parabolic shape profile for the ionic distribution. The stress profile is directly related to the ionic distribution inside the glass. The stress profile should therefore be similar to the ionic distribution, regardless of whether the distribution of ions according to a complementary error function or a parabolic function.

A divergence between expected and observed stress profiles may occur for certain glasses. This is likely due to stress relaxation present in the glass and additional annealing effects. In the presence of stress relaxation, an S-shape profile is achieved, which has a negative curvature region wherein a second derivative of stress as a function of depth is negative. In the negative curvature region, the slope rate of the stress profile in the compressive layer between the surface and the depth of compression (DOC) includes at least one region where the slope rate value changes sign, indicating that the slope (S) of the stress profile is not a monotonically increasing or decreasing function. Instead, the slope (S) changes from a decreasing to an increasing pattern or vice-versa, thus defining a S-shaped region of the stress profile.

The stress profiles herein have an S-shape before the DOC and a parabolic shape after the DOC. During an ion exchange (IOX) process, stress relaxation is occurring simultaneously while ions are diffusing. When diffusivity is fast, the amount of time at the IOX temperature limits stress relaxation to a very low level, and an almost linear decaying profile going from a surface to a depth of the sample is expected. A favorable glass composition would have a reasonably slow diffusivity in order to enhance stress relaxation to achieve the profiles herein. Slower diffusion, however, requires longer IOX times as well as higher IOX temperatures. Time for IOX can be reduced when IOX temperature increases. But, increased IOX temperatures can lead to higher processing costs and possible release of undesirable oxide gases. An optimization between IOX temperature and diffusivity can be achieved in some glass compositions much easier than other glasses.

Generally, the stress profiles herein are not frangible, so a glass composition suitable for a high frangibility limit is desired. Accordingly, suitable glass compositions used herein have a fracture toughness that is greater than or equal to 0.75 MPa*m$^{0.5}$; preferably greater than or equal to 0.8 MPa*m$^{0.5}$; preferably greater than or equal to 0.85 MPa*m$^{0.5}$ Specifically, suitable glass compositions used herein have a fracture toughness as measured by the chevron notched short bar method that is greater than or equal to 0.75 MPa*m$^{0.5}$; preferably greater than or equal to 0.8 MPa*m$^{0.5}$; preferably greater than or equal to 0.85 MPa*m$^{0.5}$. From a glass composition perspective, the presence of $K_2O$ and $P_2O_5$ lowers the frangibility limit. In one or more embodiments, a total of potassium oxide ($K_2O$) and phosphorus pentoxide ($P_2O_5$) in the glass composition is less than 2 mol % (e.g., $K_2O+P_2O_5<2$ mol %.) Glass compositions containing $Li_2O$ have higher fracture toughness relative to $Na_2O$ only glasses. In one or more embodiments, $Li_2O$ content is greater than $Na_2O$. In other words, in one or more embodiments, a molar ratio of sodium oxide ($Na_2O$) to lithium oxide ($Li_2O$) is less than 1.0 at the center of the glass-based article. High fracture toughness may also correlate with improved damage resistance (lower damage depth for the same force).

The glass-based articles herein are advantageous in that they are designed to have excellent performance for deep damage and their profiles are non-frangible, by using stress where it is needed. The profiles herein are suitable for many glass styles, including 2.5D designs where the glass thickness tapers to a much lower thickness on the edges. Without intended to be bound by theory, it is understood that by moving the tension away from the edge, through longer diffusion durations, the performance of glass can be improved. The methods described herein are advantageous in that they feasible for manufacturing on a large scale using existing equipment and can be done in a reasonable timeframe. Use of longer diffusion durations herein are expected to provide good performance in a 2.5D configuration.

Reference will now be made in detail to lithium aluminosilicate glasses according to various embodiments. Alkali aluminosilicate glasses have good ion exchangeability, and chemical strengthening processes have been used to achieve high strength and high toughness properties in alkali aluminosilicate glasses. Sodium aluminosilicate glasses are highly ion exchangeable glasses with high glass formability and quality. Lithium aluminosilicate glasses are highly ion exchangeable glasses with high glass quality. The substitution of $Al_2O_3$ into the silicate glass network increases the interdiffusivity of monovalent cations during ion exchange. By chemical strengthening in a molten salt bath (e.g., $KNO_3$ or $NaNO_3$), glasses with high strength, high toughness, and high indentation cracking resistance can be achieved. The stress profiles achieved through chemical strengthening may have a variety of shapes that increase the drop performance, strength, toughness, and other attributes of the glass articles, as well as improved scratch resistance.

Therefore, lithium aluminosilicate glasses with good physical properties, chemical durability, and ion exchangeability have drawn attention for use as cover glass. Through different ion exchange processes, greater central tension (CT), depth of compression (DOC), and compressive stress (CS) can be achieved. The stress profiles described herein provide increased drop performance for lithium containing glass articles.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. It should be understood that any of the variously recited ranges of one component may be individually combined with any of the variously recited ranges for any other component.

Disclosed herein are ion exchange methods and stress profiles for lithium aluminosilicate glass compositions. The stress profiles exhibit scratch resistance. With reference to FIG. 1, the glass has a thickness t and a first region under compressive stress (e.g., first and second compressive stress layers 120, 122 in FIG. 1) extending from the surface to a depth of compression (DOC) of the glass and a second region (e.g., central region 130 in FIG. 1) under a tensile stress or central tension (CT) extending from the DOC into the central or interior region of the glass.

The compressive stress (CS) has a maximum or peak value, which typically occurs at the surface of the glass (but such need not be the case as the peak may occur at a depth from the surface of the glass), and the CS varies with distance d from the surface according to a function. Referring again to FIG. 1, the first compressive stress layer 120 extends from first surface 110 to a depth $d_1$ and the second compressive stress layer 122 extends from second surface 112 to a depth $d_2$. Together, these segments define a compression or CS of glass 100.

The compressive stress of both compressive stress layers (120, 122 in FIG. 1) is balanced by stored tension in the central region (130) of the glass.

Figure 2:
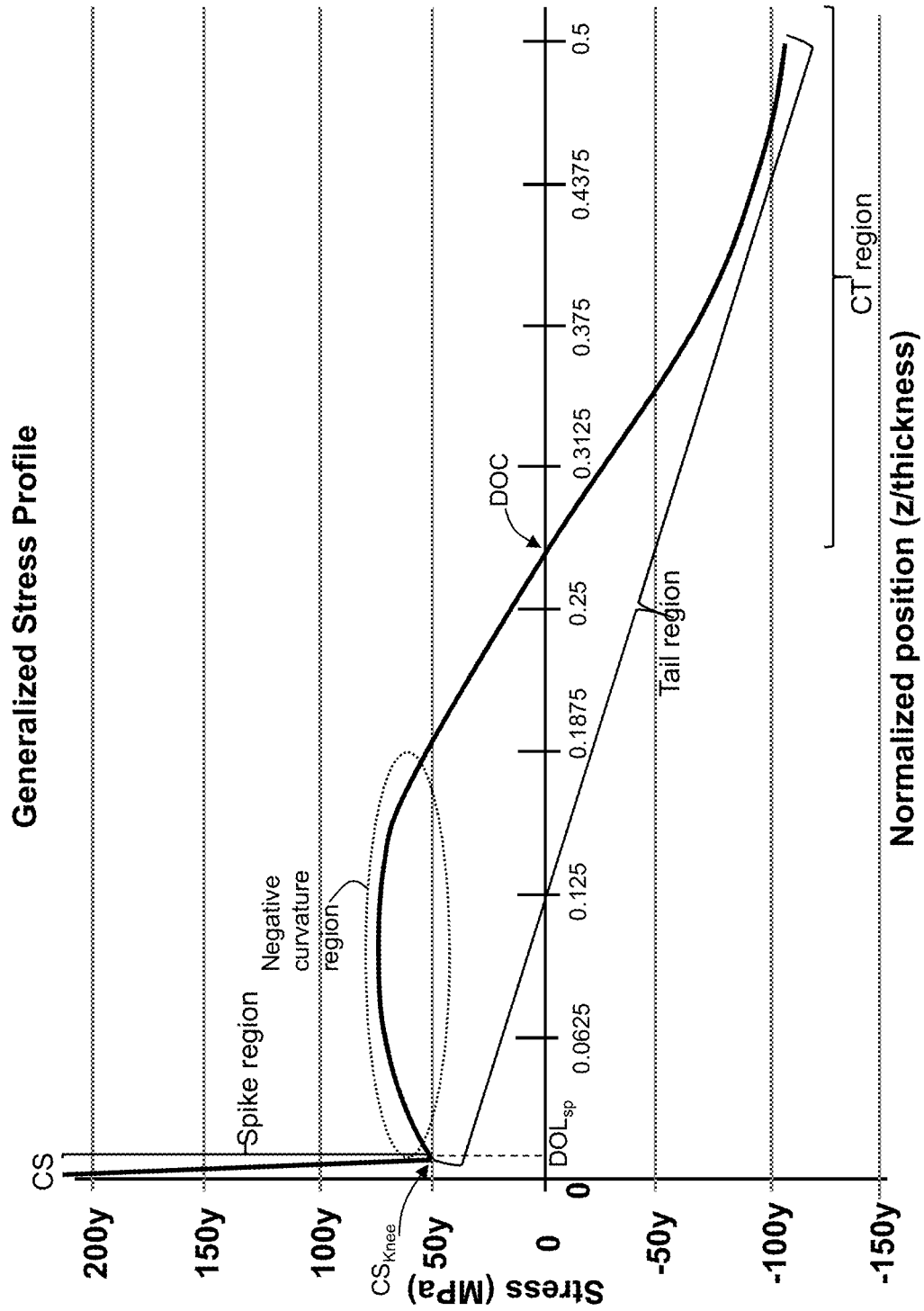
FIG. 2 is a generalized schematic stress profile graph of stress (MPa) versus normalized position (z/thickness) from a surface for an embodiment of a glass-based article.

FIG. 2 shows a schematic graph of a generalized stress profile containing a spike region near the surface extending to a knee, and a tail region extending from the knee to deeper in the glass towards the center. Stress values are not absolute in this generalized graph, which is denoted by the inclusion of "y" in the non-zero y-axis values. The stress profile comprises: a compressive stress at the surface CS, a depth of layer ($DOL_T$) of the spike region that is related to the diffusion depth of the ions near the spike, stress of the knee $CS_k$, which is the stress at the asymptotic extrapolation of the spike and deep profile regions, a depth of compression (DOC), which is the location where the stress is first zero inside the glass and changes sign from compression to tension, and a central tension (CT) that is the stress at the center of the glass. In the spike region, there is a negative curvature region where a second derivative of stress as a function of depth is negative. In FIG. 2, the convention is that compressive stress is positive and tension is negative for illustration purposes.

In one or more embodiments, the shape of the stress profile deeper than the DOC in the central tension (CT) region (where stress is in tension) may be approximated by an equation. In some embodiments, the stress profile along the CT region may be approximated by equation (B):

$$\text{Stress}(x) = \text{MaxCT} - (((\text{MaxCT} \cdot (n+1))/0.5^n) \cdot |(x/0 - 0.5|^n) \quad \text{(B)}$$

In equation (B), the stress (x) is the stress value at position x. Here the stress is positive (tension). MaxCT is the maximum central tension as a positive value in MPa. The value x is position along the thickness (t) in micrometers, with a range from 0 to t; x=0 is one surface (e.g., 110 in FIG. 1), x=0.5t is the center of the glass-based article, stress(x)=MaxCT, and x=t is the opposite surface (e.g., 112 in FIG. 1). MaxCT used in equation (B) may be in the range from about 50 MPa to about 350 MPa (e.g., 60 MPa to about 300 MPa, or from about 70 MPa to about 270 MPa), and n is a fitting parameter from 1.5 to 5 (e.g., 2 to 4, 2 to 3 or 1.8 to 2.2) whereby n=2 can provide a parabolic stress profile, exponents that deviate from n=2 provide stress profiles with near parabolic stress profiles. Reference herein to a "parabolic shape" profile includes profiles that fit both parabolic and near parabolic equations.

In the glass-based articles, there is an alkali metal oxide having a non-zero concentration that varies from one or both of first and second surfaces to a depth of layer (DOL) with respect to the metal oxide. A stress profile is generated due to the non-zero concentration of the metal oxide(s) that varies from the first surface. The non-zero concentration may vary along a portion of the article thickness. In some embodiments, the concentration of the alkali metal oxide is non-zero and varies along a thickness range from about 0·t to about 0.3·t. In some embodiments, the concentration of the alkali metal oxide is non-zero and varies along a thickness range from about 0·t to about 0.35·t, from about 0·t to about 0.4·t, from about 0·t to about 0.45·t, from about 0·t to about 0.48·t, or from about 0·t to about 0.50·t. The variation in concentration may be continuous along the above-referenced thickness ranges. Variation in concentration may include a change in metal oxide concentration of about 0.2 mol % or more along a thickness segment of about 100 micrometers. The change in metal oxide concentration may be about 0.3 mol % or more, about 0.4 mol % or more, or about 0.5 mol % or more along a thickness segment of about 100 micrometers. This change may be measured by known methods in the art including microprobe.

In some embodiments, the variation in concentration may be continuous along thickness segments in the range from about 10 micrometers to about 30 micrometers. In some embodiments, the concentration of the alkali metal oxide decreases from the first surface to a value between the first surface and the second surface and increases from the value to the second surface.

The concentration of alkali metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having a larger radius.

In one or more embodiments, the alkali metal oxide concentration gradient extends through a substantial portion of the thickness t of the article. In some embodiments, the concentration of the metal oxide may be about 0.5 mol % or greater (e.g., about 1 mol % or greater) along the entire thickness of the first and/or second section, and is greatest at a first surface and/or a second surface 0·t and decreases substantially constantly to a value between the first and second surfaces. At that value, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. The total concentration of the particular metal oxide in the glass-based article may be in the range from about 1 mol % to about 20 mol %.

The concentration of the alkali metal oxide may be determined from a baseline amount of the metal oxide in the glass-based substrate ion exchanged to form the glass-based article.

In one or more embodiments, the glass-based article comprises: a lithium-based aluminosilicate composition. In one or more embodiments, the lithium-based aluminosilicate composition comprises potassium oxide ($K_2O$) and phosphorus pentoxide ($P_2O_5$) in an amount that is less than 2 mol % of the composition, or less than 1.9 mol %, or less than 1.8 mol % of the composition, or less than 1.7 mol %, or less than 1.6 mol % of the composition, or less than 1.5 mol %, or less than 1.4 mol % of the composition, or less than 1.3 mol % of the composition, or less than 1.2 mol % of the composition, or less than 1.1 mol %, or less than 1.0 mol % of the composition, or less than 0.9 mol %, or less than 0.8 mol % of the composition, or less than 0.7 mol %, or less than 0.6 mol % of the composition, or less than 0.5 mol % of the composition, and/or greater than or equal to 0.01 mol %, including all values and subranges therebetween. In one or more embodiments, the lithium-based aluminosilicate composition comprises potassium oxide ($K_2O$) and phosphorus pentoxide ($P_2O_5$) in a total amount of: greater than or equal to 0 mol % to less than 2 mol %, or greater than or equal to 0.01 mol % to less than 1.5 mol %, or greater than or equal to 0.5 mol % to less than 1 mol %, including all values and subranges therebetween.

In one or more embodiments, the lithium-based aluminosilicate composition comprises a lithium oxide ($Li_2O$) content of greater than 8 mol %, or greater than 8.5 mol %, or greater than 9 mol %, or greater than 9.5 mol %, or greater than 10 mol %, or greater than or equal to 10.5 mol %, or greater than or equal to 11 mol %, or greater than or equal to 11.5 mol %, or greater than or equal to 12 mol %, or greater than or equal to 12.5 mol %, or greater than or equal to 13 mol %, or greater than or equal to 13.5 mol %, or greater than or equal to 14 mol %, or greater than or equal to 15 mol %, and/or less than or equal to 18 mol %. In one or more embodiments, the lithium-based aluminosilicate composition comprises a lithium oxide ($Li_2O$) content of: greater than or equal to 8 mol % to less than or equal to 18 mol %, or greater than or equal to 9 mol % to less than or equal to 16 mol %, or greater than or equal to 10 mol % to less than or equal to 14 mol %, including all values and subranges therebetween.

In one or more embodiments, the composition at a center of the glass-based article comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$. The glass composition is characterized by a molar ratio of: $(Li_2O+Na_2O+MgO)/Al_2O_3$ from 0.9 to less than 1.3; and $Al_2O_3+MgO+Li_2O+ZrO_2+La_2O_3+Y_2O_3$ from greater than 23 mol % to less than 50 mol %.

The glass-based articles disclosed herein comprise lithium aluminosilicate glass compositions that exhibit a high fracture toughness ($K_{1C}$). In some embodiments, the lithium aluminosilicate glass compositions are characterized by a $K_{1C}$ fracture toughness value as measured by a chevron short bar (CNSB) method of at least 0.75 $MPa*m^{0.5}$.

In some embodiments, the glass compositions exhibit a $K_{1C}$ value measured by CNSB method of at least 0.75, such as at least 0.76, at least 0.77, at least 0.78, at least 0.79, at least 0.80, at least 0.81, at least 0.82, at least 0.83, at least 0.84, at least 0.85, at least 0.86, at least 0.87, at least 0.88, at least 0.89, at least 0.90, at least 0.91, at least 0.92, at least 0.93 at least 0.94, at least 0.95, or at least 0.96. In embodiments, the glass compositions exhibit a $K_{1C}$ value measured by CNSB method from greater than or equal to 0.75 to less than or equal to 1.00, such as from greater than or equal to 0.76 to less than or equal to 0.99, from greater than or equal to 0.77 to less than or equal to 0.98, from greater than or equal to 0.78 to less than or equal to 0.97, from greater than or equal to 0.79 to less than or equal to 0.96, from greater than or equal to 0.80 to less than or equal to 0.95, from greater than or equal to 0.81 to less than or equal to 0.94, from greater than or equal to 0.82 to less than or equal to 0.93, from greater than or equal to 0.83 to less than or equal to 0.92, from greater than or equal to 0.84 to less than or equal to 0.91, from greater than or equal to 0.85 to less than or equal to 0.90, from greater than or equal to 0.86 to less than or equal to 0.89, or from greater than or equal to 0.87 to less than or equal to 0.88, and all ranges and sub-ranges between the foregoing values.

In one or more embodiments, the composition at the center of the glass-based article comprises: a molar ratio of sodium dioxide ($Na_2O$) to lithium dioxide ($Li_2O$) of less than 1.0 and/or greater than or equal to 0.1, including less than or equal to 0.99, or less than or equal to 0.9, or less than or equal to 0.85, or less than or equal to 0.8, or less than or equal to 0.75, or less than or equal to 0.7, or less than or equal to 0.65, or less than or equal to 0.63, or less than or equal to 0.6, or less than or equal to 0.55, or less than or equal to 0.5, or less than or equal to 0.45, or less than or equal to 0.4, or less than or equal to 0.35, or less than or equal to 0.3, or less than or equal to 0.25, or less than or equal to 0.2, or less than or equal to 0.15, and all values and subranges therebetween. In one or more embodiments, the composition at the center of the glass-based article comprises: a molar ratio of sodium dioxide ($Na_2O$) to lithium dioxide ($Li_2O$) of: greater than or equal to 0.1 to less than 1.0, or greater than or equal to 0.15 to less than or equal to 0.9, or greater than or equal to 0.2 to less than or equal to 0.85, and all values and subranges therebetween.

In one or more embodiments, the glass-based article comprises: a depth of compression (DOC) that is greater than or equal to 0.22t, or greater than or equal to 0.225t, or greater than or equal to 0.23t, or greater than or equal to 0.235t, or greater than or equal to 0.24t, or greater than or equal to 0.245t, or greater than or equal to 0.25t, and/or less than or equal to 0.30t, or less than or equal to 0.29t, or less than or equal to 0.28t, or less than or equal to 0.27t, or less than or equal to 0.26t, including all values and subranges therebetween. In one or more embodiments, the glass-based article comprises: a depth of compression (DOC) that is greater than or equal to 0.22t and less than or equal to 0.30t, or greater than or equal to 0.225t and less than or equal to 0.29t, or greater than or equal to 0.23t and less than or equal to 0.8t, including all values and subranges therebetween.

In one or more embodiments, the glass-based article comprises: a depth of compression (DOC) that is greater than or equal to 150 micrometers, or greater than or equal to 155 micrometers, or greater than or equal to 160 micrometers, or greater than or equal to 165 micrometers, or greater than or equal to 170 micrometers, including all values and subranges therebetween.

In one or more embodiments, the glass-based article comprises: t is greater than or equal to 0.02 mm and/or is less than or equal to 2 mm, including t is less than or equal to 1 mm, or less than or equal to 0.8 mm, or less than or equal to 0.75 mm, or less than or equal to 0.73 mm, or less than or equal to 0.70 mm, or less than or equal to 0.65 mm, or less than or equal to 0.6 mm, or less than or equal to 0.55 mm, and/or greater than or equal to 0.1 mm, or greater than or equal to 0.5 mm, including all values and subranges therebetween. In one or more embodiments, the glass-based article comprises: t is greater than or equal to 0.02 mm and is less than or equal to 2 mm, or greater than or equal to 0.55 mm and is less than or equal to 1 mm, or greater than or equal to 0.7 mm and is less than or equal to 0.8 mm, including all values and subranges therebetween.

Desirable values of maximum compressive stress ($CS_{max}$) are related to an application for the glass-based articles. Conditions of IOX is a factor that effects $CS_{max}$. In some embodiments, a spike is introduced to increase the $CS_{max}$. In some embodiments, a spike is not introduced. In one or more embodiments, regardless of IOX conditions, the glass-based article comprises: a maximum compressive stress ($CS_{max}$) that is greater than or equal to 150 MPa, greater than or equal to 300 MPa, greater than or equal to 350 MPa, greater than or equal to 400 MPa, greater than or equal to 450 MPa, greater than or equal to 500 MPa, greater than or equal to 550 MPa, greater than or equal to 600 MPa, greater than or equal to 650 MPa, greater than or equal to 700 MPa, greater than or equal to 750 MPa, greater than or equal to 800 MPa, greater than or equal to 850 MPa, greater than or equal to 900 MPa, greater than or equal to 950 MPa, greater than or equal to 1000 MPa, greater than or equal to 1050 MPa, greater than or equal to 1100 MPa, greater than or equal to 1150 MPa, or greater than or equal to 1200 MPa, including all values and subranges therebetween. In one or more embodiments, the glass-based article comprises: a maximum compressive stress ($CS_{max}$) of: greater than or equal to 150 MPa and less than or equal to 1200 MPa, greater than or equal to 250 MPa and less than or equal to 1100 MPa, greater than or equal to 350 MPa and less than or equal to 1000 MPa, including all values and subranges therebetween.

In one or more embodiments, the negative curvature region comprises an average compressive stress (CS) of greater than or equal to 50 MPa to less than or equal to 120 MPa, or greater than or equal to 55 MPa to less than or equal to 115 MPa, or greater than or equal to 60 MPa to less than or equal to 110 MPa, including all values and subranges therebetween.

In one or more embodiments, a peak central tension (CT) in the parabolic region in the range of greater than or equal to 100 MPa to less than or equal to 200 MPa, or greater than or equal to 125 MPa to less than or equal to 175 MPa, including all values and subranges therebetween.

In one or more embodiments, a value of a peak central tension (CT)*thickness (t) in the parabolic region is in the range of greater than or equal to 80 MPa to less than or equal to 160 MPa, or greater than or equal to 90 MPa to less than or equal to 155 MPa, including all values and subranges therebetween.

In one or more embodiments, the glass-based articles comprise a retained strength of greater than or equal to 170 MPa as measured for an article having a thickness of 600.0 µm after impact with 30 grit sandpaper with a force of 470.0 N. In one or more embodiments, the glass-based articles comprise a retained strength of greater than or equal to 170 MPa as measured for an article having a thickness of 600.0 µm after impact with 80 grit sandpaper with a force of 470.0 N. In one or more embodiments, the glass-based articles comprise a first retained strength of greater than or equal to 170 MPa as measured for an article having a thickness of 600.0 µm after impact with 30 grit sandpaper with a force of 470.0 N, and a second retained strength of greater than or equal to 170 MPa as measured for an article having a thickness of 600.0 µm after impact with 80 grit sandpaper with a force of 470.0 N. In one or more embodiments, first retained strength and the second retained strength are ±5 MPa.

In one or more embodiments, the glass-based articles comprise, as measured for an article having a thickness of 600.0 µm after impact with 30 grit sandpaper with a force of 470.0 N: a retained strength of greater than or equal to 170 MPa to less than or equal to 200 MPa, or greater than or equal to 175 MPa to less than or equal to 195 MPa, or greater than or equal to 180 MPa to less than or equal to 190 MPa, including all values and subranges therebetween.

In one or more embodiments, the glass-based articles comprise, as measured for an article having a thickness of 600.0 µm after impact with 80 grit sandpaper with a force of 470.0 N: a retained strength of greater than or equal to 170 MPa to less than or equal to 200 MPa, or greater than or equal to 175 MPa to less than or equal to 195 MPa, or greater than or equal to 180 MPa to less than or equal to 190 MPa, including all values and subranges therebetween.

In one or more embodiments, the glass-based articles comprise, as measured for an article having a thickness of 600.0 µm after impact with 30 grit sandpaper with a force of 470.0 N and as measured independently for an article after impact with 80 grit sandpaper with a force of 470.0 N: a retained strength of greater than or equal to 170 MPa to less than or equal to 200 MPa, or greater than or equal to 175 MPa to less than or equal to 195 MPa, or greater than or equal to 180 MPa to less than or equal to 190 MPa, including all values and subranges therebetween.

Design of Glass-Based Substrates

In one or more embodiments, the glass stress-based substrates achieve a stress relaxation rate, which is (100*(1−ratio of relaxed stress ($\sigma_r$) to initial stress ($\sigma_o$)) of greater than or equal to 10%, or 20%, or 30%, or 40%, or 50% or 60%, or 70%, or 80%, or more and/or less than or equal to 100%, less than or equal to 90%, less than or equal to 85%, including all values and subranges therebetween. In one or more embodiments, the stress relaxation rate of the glass stress-based substrates is: greater than or equal to 10% and less than or equal to 100%, greater than or equal to 20% and less than or equal to 90%, greater than or equal to 25% and less than or equal to 80%, including all values and subranges therebetween. Compositions for suitable glass-based substrates are designed accordingly to comprise a desirable combination of: a glass transition temperature ($T_g$), a liquid fragility index (m), and fictive temperature ($T_f$).

In one or more embodiments, the $T_g$ is greater than or equal to 550° C. or less than or equal to 650° C., including all values and subranges therebetween. In one or more embodiments, the $T_g$ is greater than or equal to 550° C. and less than or equal to 650° C., including all values and subranges therebetween.

In one or more embodiments, the value of $T_f$ minus $T_g$ is greater than or equal to −30° C. or less than or equal to 100° C., including all values and subranges therebetween. In one or more embodiments, the value of $T_f$ minus $T_g$ is greater than or equal to −30° C. and less than or equal to 100° C., or greater than or equal to 0° C. and less than or equal to 95° C., or greater than or equal to 30° C. and less than or equal to 90° C., including all values and subranges therebetween.

In one or more embodiments, m is greater than or equal to 25 or less than or equal to 60, including all values and subranges therebetween. In one or more embodiments, m is greater than or equal to 25 and less than or equal to 60, or greater than or equal to 30 and less than or equal to 55, greater than or equal to 35 and less than or equal to 50, including all values and subranges therebetween.

Viscosity of the glass-based substrate contributes to stress relaxation rate. For a glass being at its nonequilibrium state, viscosity is extremely high for measurement. A desired ion exchange (IOX) treatment temperature ($T_{IOX}$) and a glass transition temperature are preferred to have the following range: $T_g$−200° C.<$T_{IOX}$<$T_g$−50° C. The upper limit is established to make sure there is still retained ion exchange stress rather than all stress that is mostly relaxed.

Stress relaxation is a common phenomenon for glass under stress. Wherever there is stress, glass undergoes stress relaxation. Stress relaxation follows stretched exponential equation as shown in equation (1).

$$\sigma_r = \sigma_0 \left\{ 1 - \exp\left[-\left(\frac{t}{\tau}\right)^\beta\right] \right\} \quad (1)$$

where $\sigma_r$ is the relaxed stress, $\sigma_0$ is the initial stress, t is the physical time, and $\tau$ is the characteristic relaxation time, $\beta$ is the stretched exponential. Stress relaxation according to equation (1) is a property of a base glass substrate, used without requiring subjecting the substrate to ion exchange (IOX). The expectation is if a glass undergoes significant stress relaxation in thermal conditions normally used for IOX, then a glass article having undergone IOX under such thermal conditions will also experience significant stress relaxation. Therefore, stress relaxation according to equation (1) is a way to predict stress relaxation performance on IOX'd glass. In a typical IOX temperature range, the relaxation time can be approximated by the Arrhenius equation (2):

$$\tau = \tau_0 \exp\left(\frac{E}{RT}\right) \quad (2)$$

where $\tau_0$ is the relaxation time when temp T goes to infinity, E is activation energy.

Relaxation time is directly linked to viscosity through Maxwell equation (3):

$$\tau = \frac{\eta}{G} \quad (3)$$

where η is viscosity and G is shear modulus. Based on lab stress relaxation data, the shear modulus is different from the lab measured shear modulus. The article entitled "Topological origin of stretched exponential relaxation in glass" by Potuzak et. al [Marcel Potuzak, Roger C. Welch, and John C. Mauro, J. of Chem. Phys. 135, 214502 (2011)] discusses stress relaxation measurement and is incorporated herein by reference. To best fit lab measured stress relaxation, G is approximately 100 MPa.

According to MAP non-equilibrium viscosity model by Mauro et al [J. C. Mauro, D. C. Allan, M. Potuzak, Phys. Rev. B 80, 094204 (2009).] and composition dependent viscosity model [X. J. Guo, J. C. Mauro, D. C. Allan, M. M. Smedskjaer, J. Am. Ceram. Soc. 2018; 101:1169-1179], the expression to determine the composition dependence of nonequilibrium glass viscosity is:

$$\log_{10}\eta(T, T_f, x) = \quad (4)$$
$$y(T, T_f, x)\log_{10}\eta_{eq}(T_f, x) + \lfloor(1 - y(T, T_f, x))\rfloor\log_{10}\eta_{ne}(T, T_f, x),$$

where $$y(T, T_f, x) = \left[\frac{\min(T, T_f)}{\max(T, T_f)}\right]^{p(x_{ref})m(x)/m(x_{ref})}, \quad (5)$$

In the viscosity model of Eq. (4), $\eta_{eq}$ and $\eta_{ne}$ are given by Eqs. (6) and (7), respectively. We assume that $A(x)=A(x_{ref})$ and $\Delta H(x)=\Delta H(x_{ref})$ are constant over the composition range of interest, i.e., the composition dependence of $\eta_{ne}(T,T_f,x)$ is contained in the last term of Eq. (7).

$$\log_{10}\eta_{eq}(T_f) = \quad (6)$$
$$\log_{10}\eta_\infty + (12 - \log_{10}\eta_\infty)\frac{T_g}{T_f}\exp\left[\left(\frac{m}{12 - \log_{10}\eta_\infty} - 1\right)\left(\frac{T_g}{T_f} - 1\right)\right],$$

where $T_g$ is the glass transition temperature ($10^{12}$ Pa s isokom temperature), m is the liquid fragility index:

$$m(x) = \partial \log 10\ \eta eq(T,x)\partial(T_g(x/T)\square T = T_g(x)$$

and $\eta_\infty = 10^{-2.9}$ Pa·s is the infinite temperature limit of liquid viscosity, which is a universal composition independent constant for silicate liquids.

$$\log_{10}\eta_{ne}(T, T_f) = A + \frac{\Delta H}{kT\ln 10} - \frac{S_\infty}{k\ln 10}\exp\left[-\frac{T_g}{T_f}\left(\frac{m}{12 - \log_{10}\eta_\infty} - 1\right)\right]. \quad (7)$$

where A is a constant related to the attempt frequency, ΔH the dominant activation enthalpy for isostructural flow, and $S_\infty$ is the configurational entropy in the infinite temperature limit.

Based on previous enthalpy landscape modeling of Mauro, an exponentially large number of configurational microstates exists for higher fragility systems, each with an exponentially large number of possible transition states. Hence, we assume that $S_\infty$ varies exponentially with fragility, $$S_\infty(x) = S_\infty(x_{ref})\exp\left(\frac{m(x) - m(x_{ref})}{12 - \log_{10}\eta_\infty}\right). \quad (7)$$

Examples herein demonstrate the use of this model.

In one or more embodiments, a method of manufacturing a glass-based article comprises: preparing a glass composition; exposing the glass composition to a process to form a glass-based substrate comprising: a glass transition temperature ($T_g$), a liquid fragility index (m), and fictive temperature ($T_f$), wherein $T_g$ is less than or equal to 650° C., the difference between $T_f$ and $T_g$ is greater than or equal to −30° C., and m is greater than or equal to 25; and exposing the glass-based substrate to ion exchange conditions of less than or equal to 550° C., including less than or equal to 500° C., to form a glass-based article such that a stress relaxation rate is greater than or equal to 10%.

Glass-Based Substrates

Examples of materials that may be used to form the glass-based substrates include glass and glass-ceramic materials. Exemplary glasses that may be used as substrates may include alkali-alumino silicate glass compositions or alkali-containing aluminoborosilicate glass compositions, though other glass compositions are contemplated. Specific examples of glass-based substrates that may be used include but are not limited to an alkali-alumino silicate glass, an alkali-containing borosilicate glass, an alkali-alumino borosilicate glass, an alkali-containing lithium alumino silicate glass, or an alkali-containing phosphate glass. The glass-based substrates have base compositions that may be characterized as ion exchangeable. As used herein, "ion exchangeable" means that a substrate comprising the composition is capable of exchanging cations located at or near the surface of the substrate with cations of the same valence that are either larger or smaller in size.

In one or more embodiments, glass-based substrates may include a lithium-containing aluminosilicate.

In embodiments, the glass-based substrates may be formed from any composition capable of forming the stress profiles. In some embodiments, the glass-based substrates may be formed from the glass compositions described in U.S. application Ser. No. 16/202,691 titled "Glasses with Low Excess Modifier Content," filed Nov. 28, 2018, the entirety of which is incorporated herein by reference. In some embodiments, the glass articles may be formed from the glass compositions described in U.S. application Ser. No. 16/202,767 titled "Ion-Exchangeable Mixed Alkali Aluminosilicate Glasses," filed Nov. 28, 2018, the entirety of which is incorporated herein by reference.

The glass-based substrates may be characterized by the manner in which it may be formed. For instance, the glass-based substrates may be characterized as float-formable (i.e., formed by a float process), down-drawable and, in particular, fusion-formable or slot-drawable (i.e., formed by a down draw process such as a fusion draw process or a slot draw process). In embodiments, the glass-based substrates may be roll formed. For glass-ceramics, a ceramming step may be included. Other forming methods may be used for glasses and glass-ceramics.

Some embodiments of the glass-based substrates described herein may be formed by a down-draw process. Down-draw processes produce glass-based substrates having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass-based substrates may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass-based substrates described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In one or more embodiments, a base composition comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$. The glass composition is characterized by $(Li_2O+Na_2O+MgO)/Al_2O_3$ from 0.9 to less than 1.3; and $Al_2O_3+MgO+Li_2O+ZrO_2+La_2O_3+Y_2O_3$ from greater than 23 mol % to less than 50 mol %.

In one or more embodiments, the glass-based substrates described herein may exhibit an amorphous microstructure and may be substantially free of crystals or crystallites. In other words, the glass-base substrates articles exclude glass-ceramic materials in some embodiments.

In one or more embodiments, an annealing step is conducted after ion exchange. That is, the annealing step is optional. Annealing at temperatures of, for example, 500° C.±50° C. for durations of approximately 15 to 60 minutes may be used to achieve deeper depth of compression (DOC) and/or stress relaxation rate.

Ion Exchange (IOX) Treatment

Chemical strengthening of glass-based substrates having base compositions is done by placing the ion-exchangeable glass-based substrates to an ion exchange medium. In embodiments, the ion exchange medium may be a molten bath containing cations (e.g., K+, Na+, Ag+, etc) that diffuse into the glass while the smaller alkali ions (e.g., Na+, Li+) of the glass diffuse out into the molten bath. The replacement of the smaller cations by larger ones creates compressive stresses near the surface of glass. Tensile stresses are generated in the interior of the glass to balance the near-surface compressive stresses.

With respect to ion exchange processes, they may independently be a thermal-diffusion process or an electro-diffusion process. Non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

After an ion exchange process is performed, it should be understood that a composition at the surface of a glass article may be different than the composition of the as-formed glass-based substrate (i.e., the glass-based substrate before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the glass composition at or near the center of the depth of the glass article will, in embodiments, still have the composition of the as-formed glass-based substrate.

In one or more embodiments, the potassium salt comprises: $KNO_3$, $K_2CO_3$, $K_3PO_4$, $K_2SO_4$, $K_3BO_3$, KCl, or combinations thereof.

In one or more embodiments, the sodium salt comprises: $NaNO_3$, $Na_2CO_3$, $Na_3PO_4$, $Na_2SO_4$, $Na_3BO_3$, NaCl, or combinations thereof.

In one or more embodiments, the lithium salt comprises: $LiNO_3$, $Li_2CO_3$, $Li_3PO_4$, $Li_2SO_4$, $Li_3BO_3$, LiCl, or combinations thereof.

In one or more embodiments, the potassium salt comprises $KNO_3$, the sodium salt comprises $NaNO_3$, and the lithium salt comprises $LiNO_3$.

After IOX treatment, an optional annealing step may be applied as discussed above.

In one or more embodiments, a method of manufacturing a glass-based article comprises: exposing a glass-based substrate having opposing first and second surfaces defining a substrate thickness (t) and a lithium-based aluminosilicate composition to an ion exchange treatment comprising: a first molten salt bath and a second molten salt bath to form the glass-based article; wherein the glass-based article comprises: a fracture toughness that is greater than or equal to 0.75 $MPa*m^{0.5}$; and a stress profile comprising: a spike region extending from the first surface to a knee; and a tail region extending from the knee to a center of the glass-based article, the tail region comprising: a negative curvature region wherein a second derivative of stress as a function of depth is negative; a depth of compression (DOC) that is greater than or equal to 0.22t, and a parabolic region originating at the DOC and extending to the center of the glass-based article.

End Products

Figure 3A:
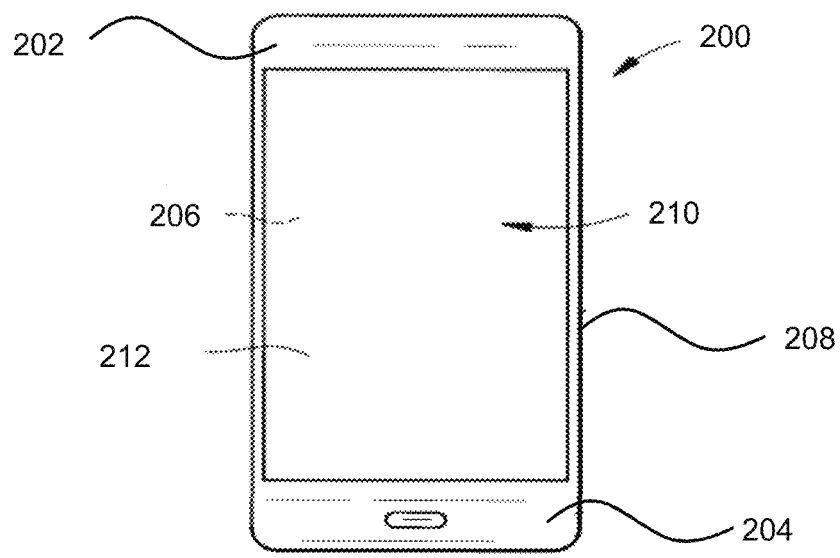
FIG. 3A is a plan view of an exemplary electronic device incorporating any of the glass articles disclosed herein.
Figure 3B:
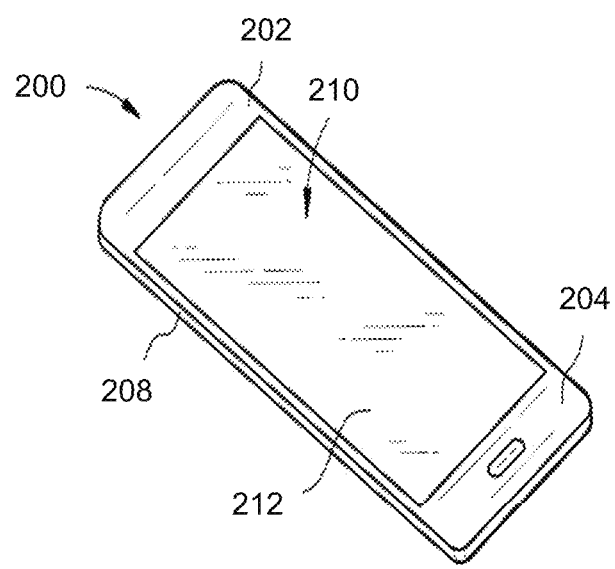
FIG. 3B is a perspective view of the exemplary electronic device of FIG. 3A.

The glass-based articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 3A and 3B. Specifically, FIGS. 3A and 3B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover 212 at or over the front surface of the housing such that it is over the display. In some embodiments, at least a portion of at least one of the cover 212 and/or housing 202 may include any of the glass articles disclosed herein.

EXAMPLES

Various embodiments will be further clarified by the following examples. In the Examples, prior to being strengthened, the Examples are referred to as "substrates". After being subjected to strengthening, the Examples are referred to as "articles" or "glass-based articles".

In the following examples, glass substrates according to Compositions A or B were ion exchanged and the resulting articles tested. Compositions A and B and glass substrates resulting therefrom had the following attributes.

Composition A: 17.83 mol % $Al_2O_3$, 6.11 mol % $B_2O_3$, 4.41 mol % MgO, 1.73 mol % $Na_2O$, 58.39 mol % $SiO_2$, 0.08 mol % $SnO_2$, 0.18 mol % $K_2O$, 0.02 mol % $Fe_2O_3$, 0.58 mol % CaO, and 10.66 mol % $Li_2O$ (0.00 mol % SrO, 0.00 mol % ZnO, and 0.00 mol % $P_2O_5$); and a $Na_2O/Li_2O$ molar ratio of 0.16. The glass substrate according to Composition A had: a fracture toughness of 0.85 mPa $MPa*m^{0.5}$; a $T_f$ of about 660° C., a $T_g$ of about 617° C., a difference between $T_f$ and $T_g$ of about 43° C.; and a liquid fragility index (m) of 35.

Composition B: 12.88 mol % $Al_2O_3$, 1.84 mol % $B_2O_3$, 2.86 mol % MgO, 2.39 mol % $Na_2O$, 70.96 mol % $SiO_2$, 0.07 mol % $SnO_2$, 0.02 mol % $Fe_2O_3$, 8.13 mol % $Li_2O$, and 0.85 mol % ZnO, (0.00 mol % $K_2O$, 0.00 mol % CaO, 0.00 mol % SrO, and 0.00 mol % $P_2O_5$); and a $Na_2O/Li_2O$ molar ratio of 0.29. The glass substrate according to Composition B had a fracture toughness of 0.8 mPa $MPa*m^{0.5}$.

The stress profiles of experimental examples herein were measured via the Refractive Near Field (RNF) method where the CT matches the measurements of CT provided by scattering polarimetry using a SCALP-5 made by Glasstress Co., Estonia. In addition, due to limitations of the RNF to provide accurate information in the first ~2 μm of the stress profile due to the size of the beam used in this measurement technique, the RNF data is extrapolated to the surface to find the stress at the surface so that it also matches the measurements done by the FSM-6000 LE from Orihara, Japan that measures the estimated stress at the surface. Therefore, the total stress profile matches at the center of the sample the CT measured by the SCALP instrument and at the surface the CS measured by the FSM-6000 LE instrument, using a light source at 365 nm, providing an accurate representation of the whole stress profile from surface to the center of the sample.

Figure 10:
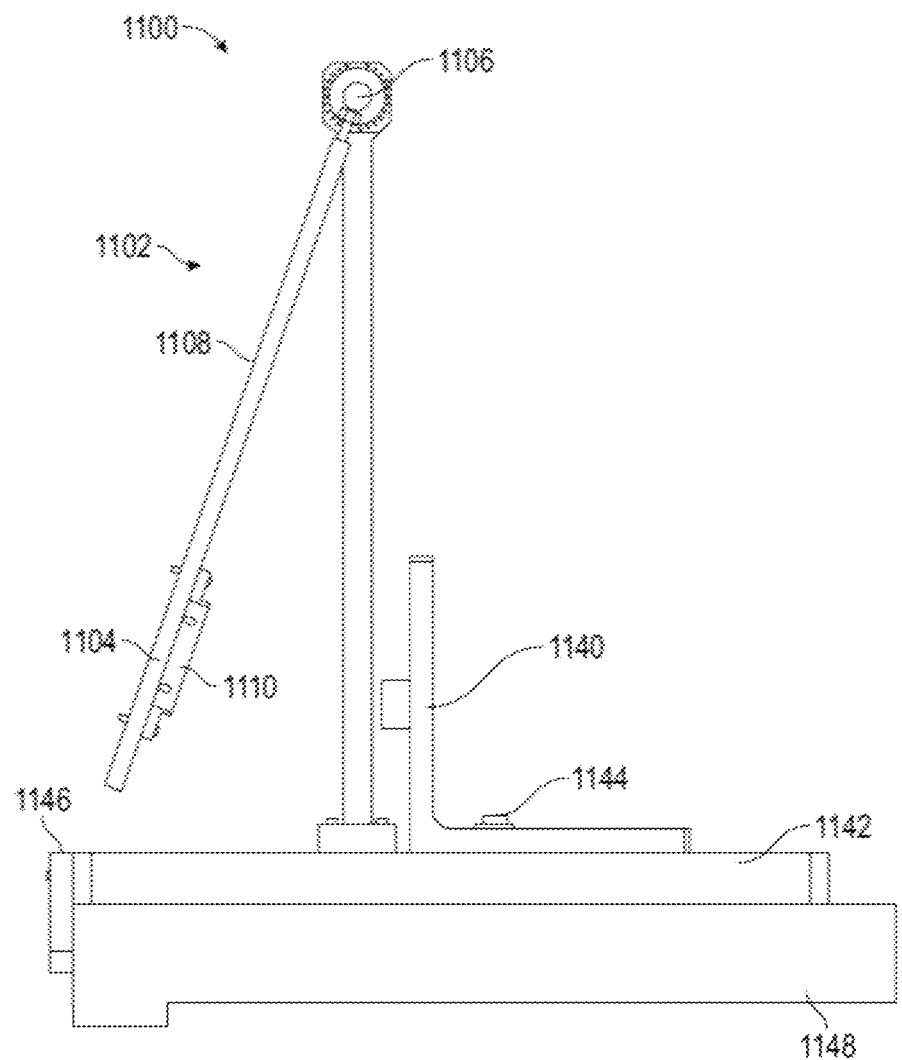
FIG. 10 is a schematic view of an apparatus that introduces damage to a glass article via impact with an impacting object.
Figure 11:
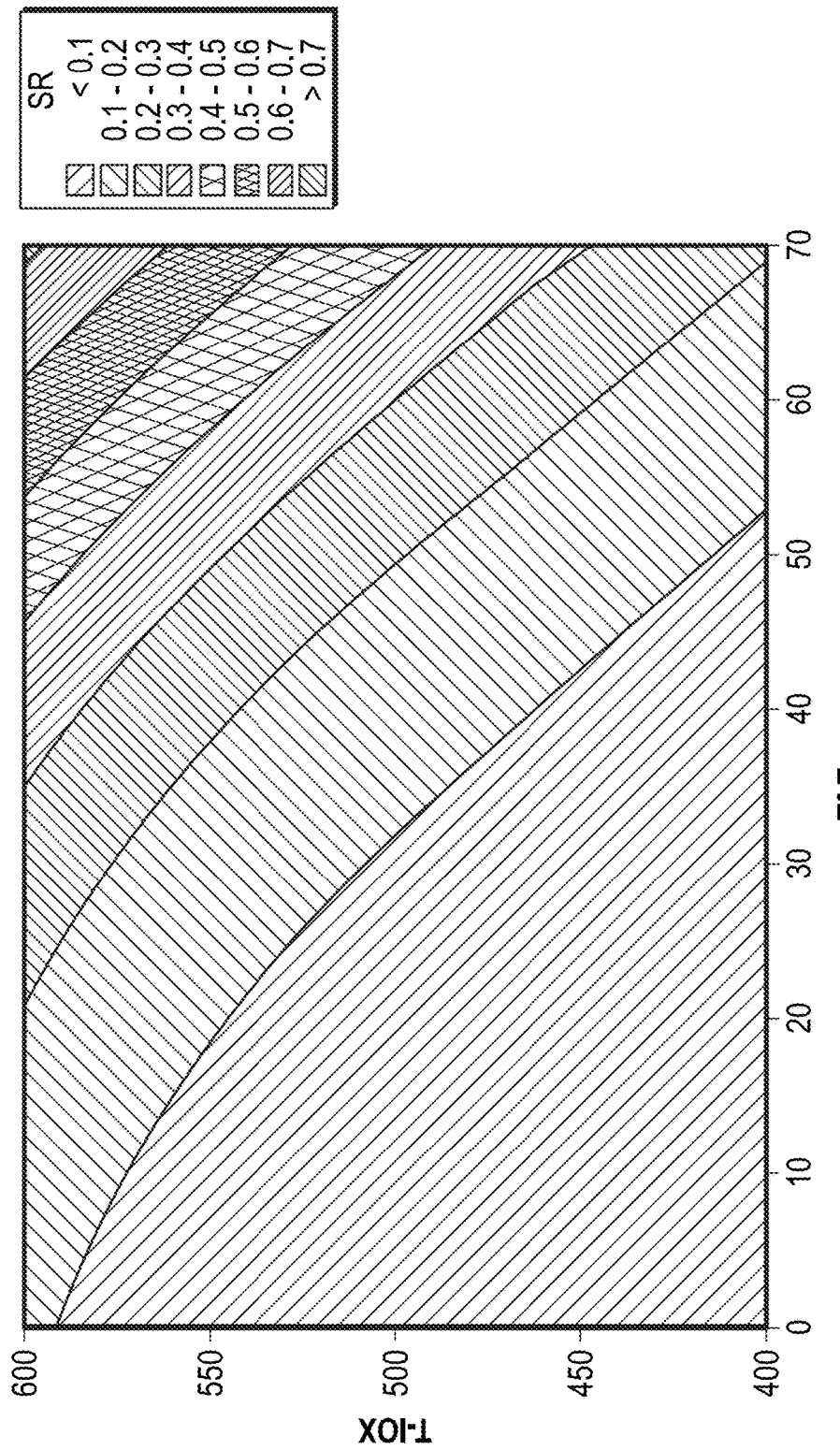
FIGS. 11-14 are stress relaxation rates according to embodiments of glass-based substrates.
Figure 12:
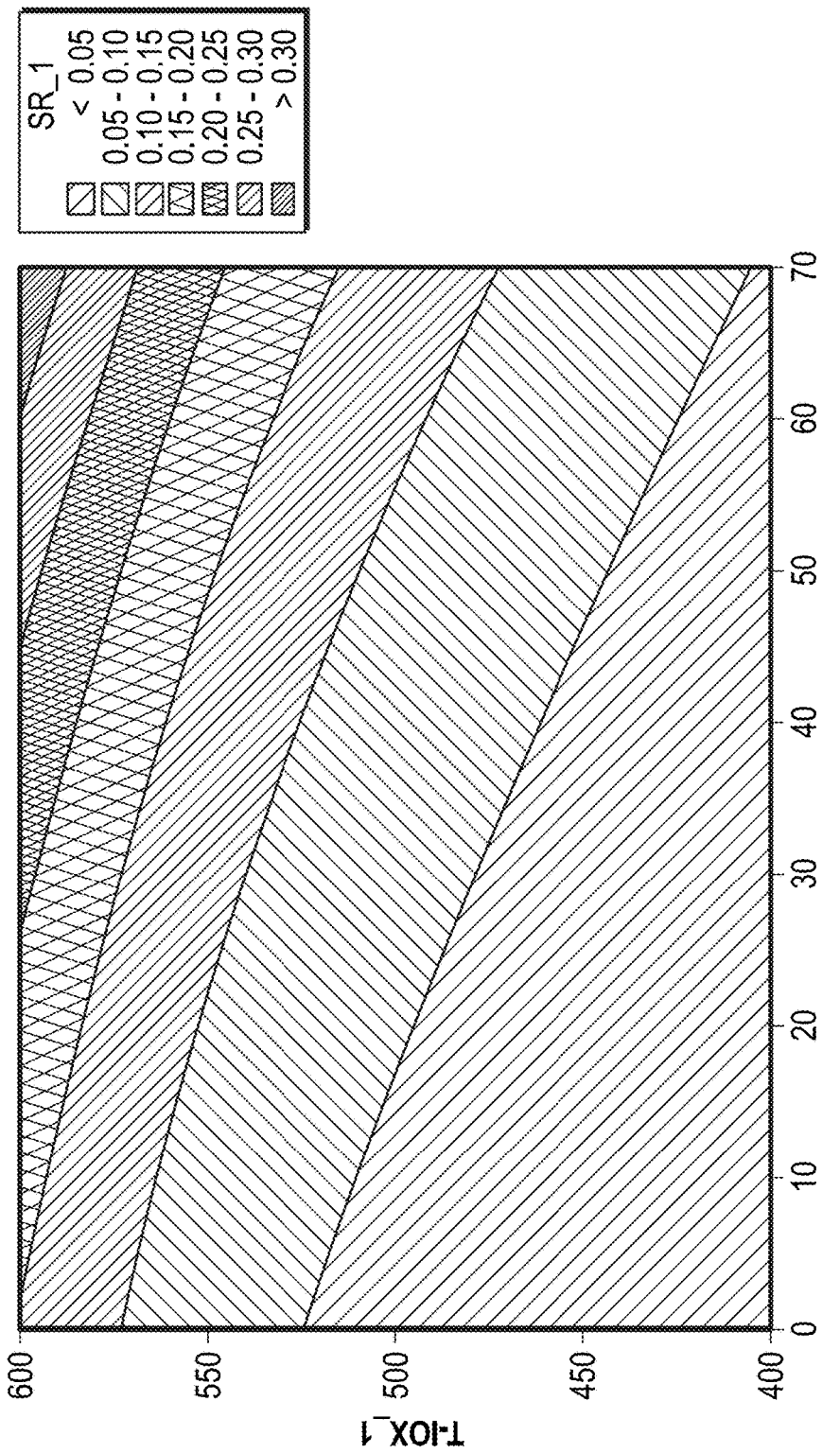
Figure 13:
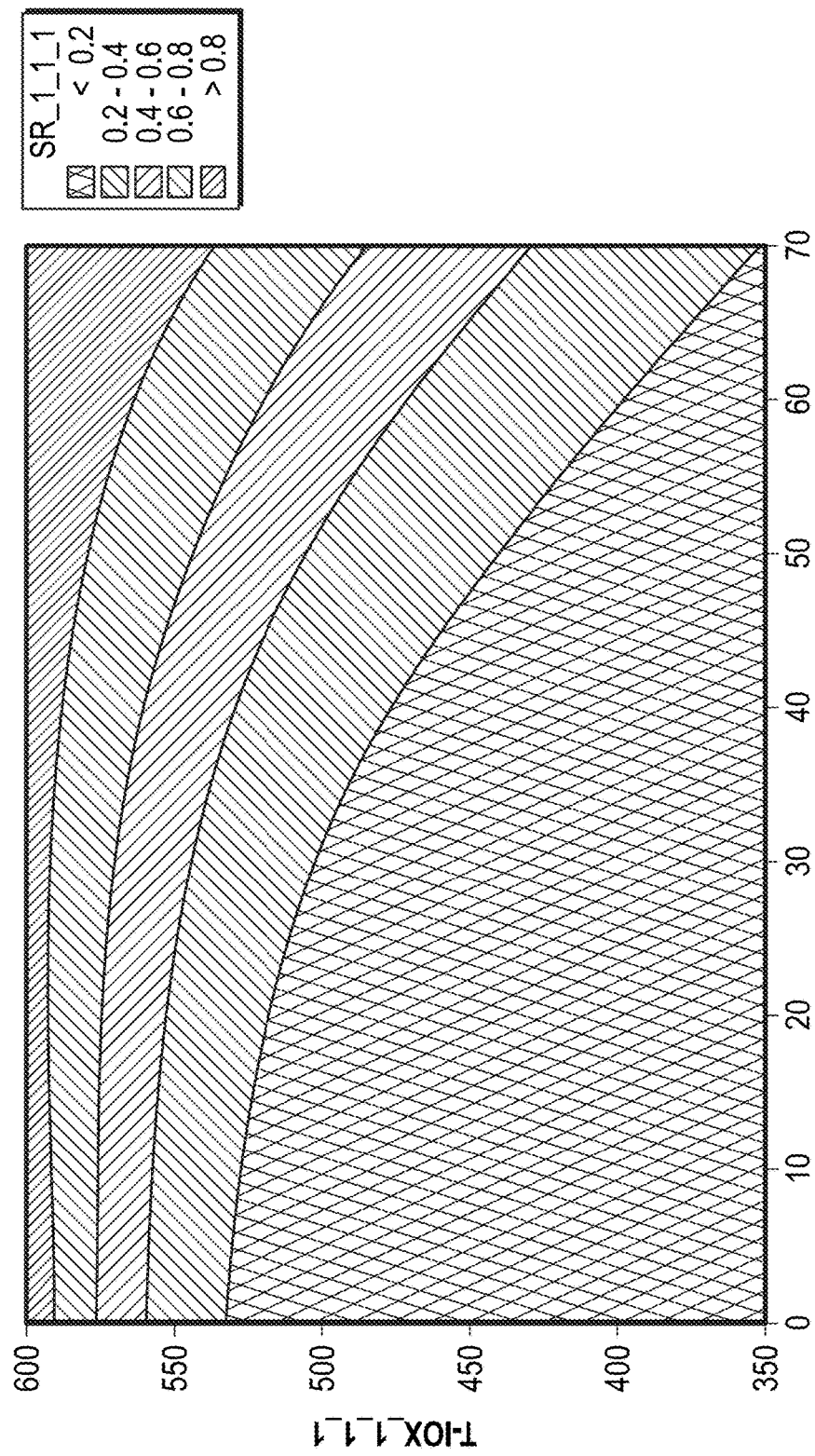
Figure 14:
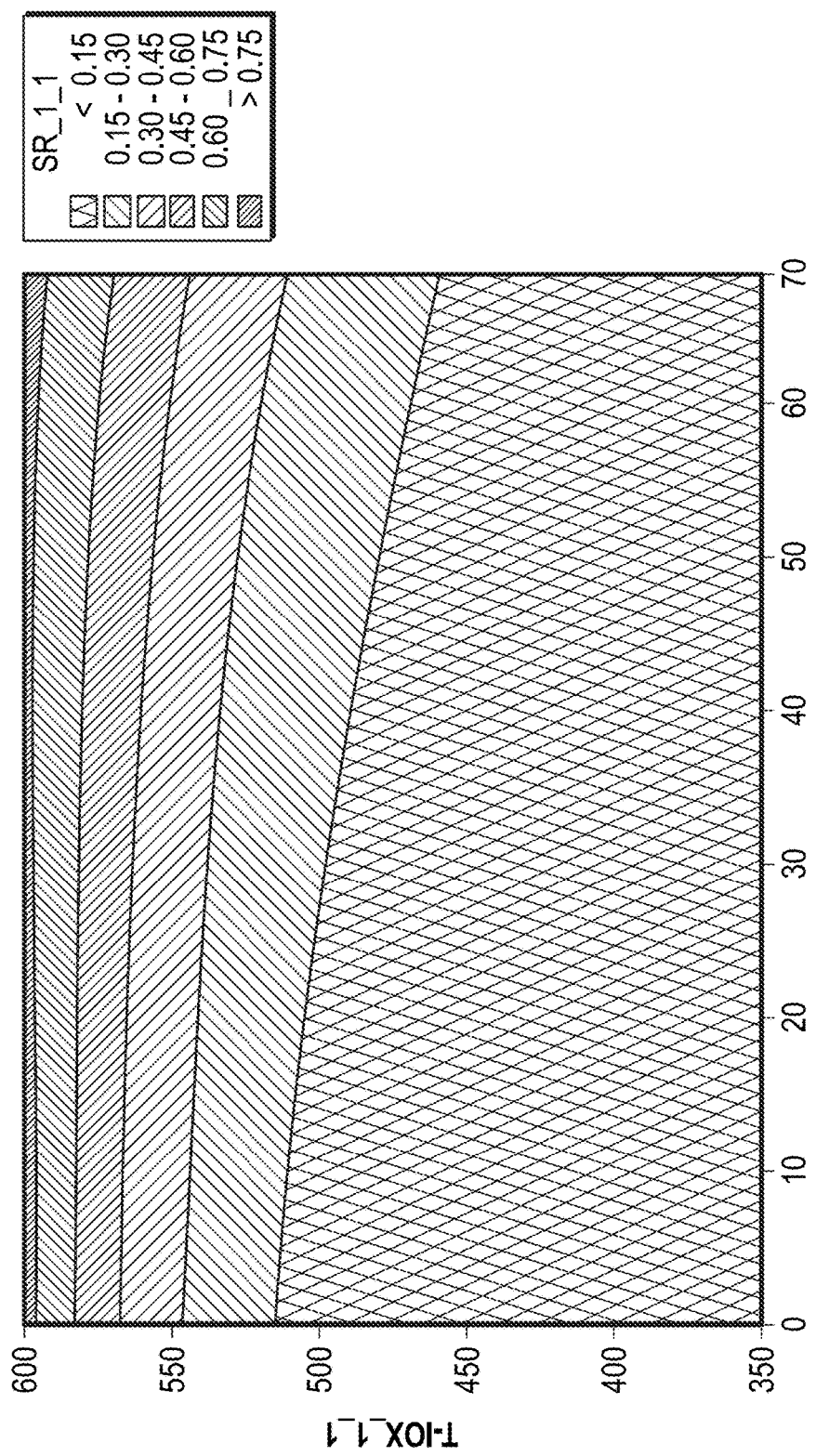

The term "retained strength," as used herein, refers to the strength of a glass article after damage introduction by an impact force when the article is bent to impart tensile tress. Damage is introduced according to a "surface impact test" method described in U.S. Patent Publication No. 2019/0072469 A1, which is incorporated herein by reference. For example, an apparatus for impact testing a glass article is shown as reference number 1100 in FIG. 10. The apparatus 1100 includes a pendulum 1102 including a bob 1104 attached to a pivot 1106. The term "bob" on a pendulum, as used herein, is a weight suspended from and connected to a pivot by an arm. Thus, the bob 1104 shown is connected to the pivot 1106 by an arm 1108. The bob 1104 includes a base 1110 for receiving a glass article, and the glass article is affixed to the base. The apparatus 1100 further includes an impacting object 1140 positioned such that when the bob 1104 is released from a position at an angle greater than zero from the equilibrium position, the surface of the bob 1104 contacts the impacting object 1140. The impacting object includes an abrasive sheet having an abrasive surface to be placed in contact with the outer surface of the glass article. The abrasive sheet may comprise sandpaper, which may have a grit size in the range of 30 grit to 400 grit, or 100 grit to 300 grit, for example 30 or 80 grit.

For purposes of this disclosure, the impacting object was in the form of a 6 mm diameter disk of 30 grit or 80 grit sandpaper affixed to the apparatus. A glass article having a thickness of approximately 600.0 μm was affixed to the bob. For each impact, a fresh sandpaper disk was used. Damage on the glass article was done at approximately 470 N impact force by pulling the swing of the arm of the apparatus to approximately a 90° angle. Approximately 10 samples of each glass article were impacted.

After twelve hours or more of the damage introduction, the glass articles were fractured in four-point bending (4PB). The damaged glass article was placed on support rods (support span) with the damaged site on the bottom (i.e., on the tension side) and between the load roads (loading span). For purposes of this disclosure, the loading span was 18 mm and the support span was 36 mm. The radius of curvature of load and support rods was 3.2 mm. Loading was done at a constant displacement rate of 5 mm/min using a screw-driven testing machine (Instron®, Norwood, Massachusetts, USA) until failure of glass. 4PB tests were done at a temperature of 22° C.±2° C. and at a RH (relative humidity) of 50%±5%.

The applied fracture stress (or the applied stress to failure) $\sigma_{app}$ in four-point bending (4PB) was calculated from the equation (C)

$$\sigma_{app} = \frac{1}{(1-v^2)} \frac{3P(L-a)}{2bh^2} \qquad (C)$$

where, P is the maximum load to failure, L (=36 mm) is the distance between support rods (support span), a (=18 mm) is the distance between the loading rods (loading span), b is the width of the glass plate, h is the thickness of the glass plate and v is the Poisson's Ratio of the glass composition. The term $(1/(1-v^2))$ in Eq. (C) considers the stiffening effect of a plate. In four-point bending, stress is constant under the loading span and thus, the damaged site is under mode I uniaxial tensile stress loading. The stressing rate of the 4-point bend testing for the specimens was estimated to be between 15 to 17 MPa per sec. The retained strength of the glass composition is the highest applied fracture stress at which failure does not occur.

Examples 1-2 and A-B (Comparative)

Table 1 provides a summary of dual ion exchange (DIOX) conditions using nitrate salts of potassium (K) and sodium (Na), as noted, for Examples 1-2. A substrate according to composition A having a thickness of 800 micrometers was used. The DIOX conditions included a preheat at 380° C. for 10 minutes and were the same for both Examples 1-2. Also shown in Table 1 is data for: percentage weight gain, compressive stress (CS), knee depth of layer ($DOL_k$), and central tension (CT). Both Step I and Step II included the addition of 0.5 wt. % silicic acid to the IOX bath. Between Step I and Step II, the substrate was cleaned to remove excess salt.

TABLE 1

| EXAMPLE | Substrate | DIOX Step I* | Step II* | Weight Gain (%) | CS (MPa) | $DOL_k$ (μm) | CT (MPa) |
|---|---|---|---|---|---|---|---|
| 1 | A | 60 wt % K/ 40 wt % Na, 450° C., 10 hours | 100 wt % K 500° C., 45 minutes | 0.0596 | 894.4 | 6.79 | 149.5 |
| 2 | A | 60 wt % K/ 40 wt % Na, 450° C., 10 hours | 100 wt % K 500° C., 45 minutes | 0.0555 | — | — | — |

*Each of Step I and Step II included the addition of 0.5 wt. % silicic acid.

Examples 1-2 were annealed at 500° C. after DIOX. Table 2 provides the CT data and DOC (μm).

TABLE 2

| EXAMPLE | Annealing time (minutes) | CT (MPa) | DOC (μm) |
|---|---|---|---|
| 1 | 30 | 125 | 210 0.2625 · t |
| 2 | 60 | 105 | 220 0.275 t |

Table 3 provides a summary of single ion exchange (SIOX) conditions using nitrate salts of potassium (K), sodium (Na), and lithium (Li) as noted, for Examples A-B (comparative). Example A used an 800 micrometer-thick substrate of Composition A. Example B used an 800 micrometer-thick substrate of Composition B. Also shown in Table 3 is data for: compressive stress (CS), compressive stress at a knee ($CS_k$), knee depth of layer ($DOL_k$), central tension (CT), and depth of compression (DOC) values. The IOX step included the addition of 0.5 wt. % silicic acid to the IOX bath.

TABLE 3

| EX-AMPLE | Sub-strate | SIOX* | CS (MPa) | $DOL_k$ (μm) | CT (MPa) | DOC (μm) |
|---|---|---|---|---|---|---|
| A | A | 90 wt % K/ 10 wt % Na,/ 1.4 Li 450° C., 8.4 hours | 600 | 5 | 110 | 167 0.209 t |
| B | B | 93.5 wt % K/ 6.5 wt % Na, 430° C., 4.5 hours | 700 | 7 | 88 | 180 0.225 t |

*included the addition of 0.5 wt. % silicic acid.

Figure 4:
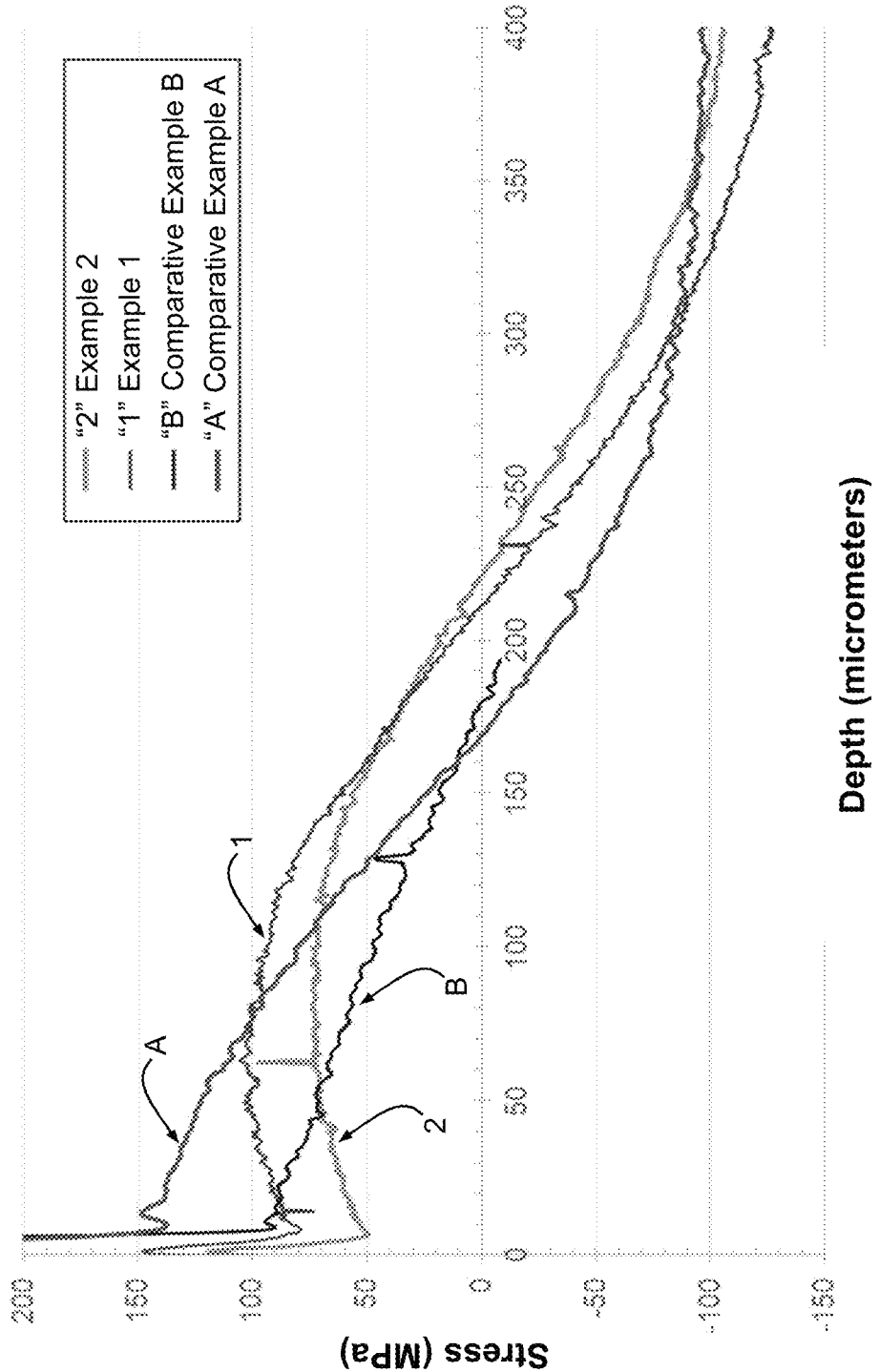
FIG. 4 is a plot of stress (MPa) versus depth (micrometers) from a surface for embodiments of a glass-based article and comparative examples.
Figure 5:
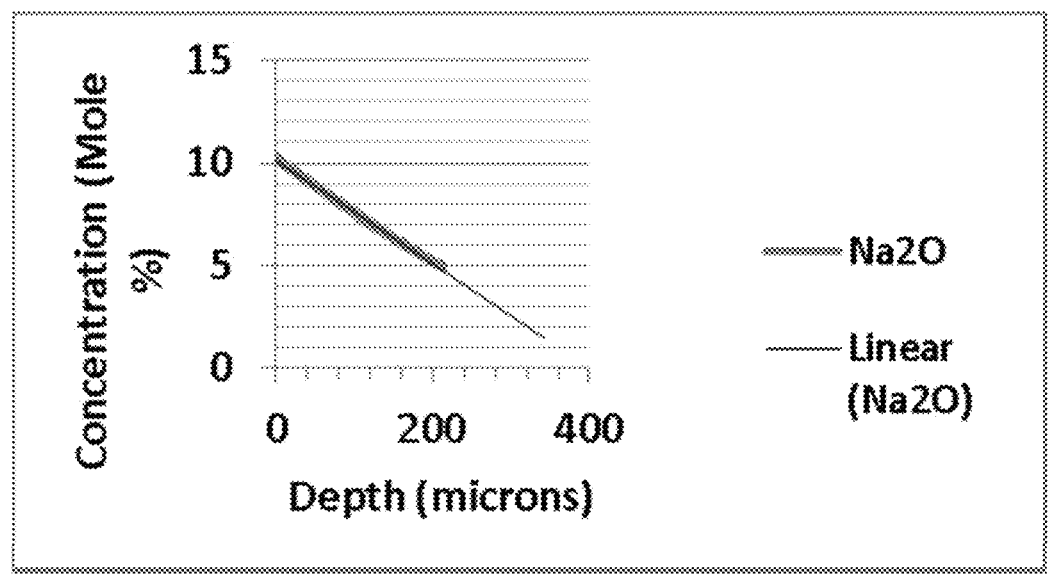
FIG. 5 is a plot of a sodium dioxide ($Na_2O$) concentration versus depth for an embodiment.

FIG. 4 provides stress profiles (stress (MPa) versus depth (micrometers)) for Examples 1-2 and A-B (comparative). FIG. 4 shows regions of negative curvature: for Example 1 the region of negative curvature includes depths of approximately 20 to approximately 140 micrometers and for Example 2 the region of negative curvature includes depths of approximately 10 to approximately 160 micrometers. FIG. 5 is a plot of a sodium dioxide ($Na_2O$) concentration versus depth for Example 1 as measured by GD-OES. Solid line is a linear fit of the $Na_2O$ profile. Surface CS as a result of force balance is equal to $CS=BE\Delta C/(1-v)$, where $\Delta C=C_0-C_{ave}$ surface $Na_2O$ concentration subtract the average $Na_2O$ concentration through thickness, B is linear lattice dilation coefficient, E is Young's modulus, v is Poisson's ratio. Based on FIG. 5, $C_0=10.2$, and $C_{ave}=5.1$. Therefore, theoretical unrelaxed stress ($\sigma_o$) was approximately over 300 MPa when ignoring stress relaxation, assuming B was about 0.6 ppk/mol %. (As published in Journal of Non-Crystalline Solids, 358 (2012) 316-320 by Tandia et al.) In this cited paper, the authors dealt with Na+→K+ IOX, the coefficient B was approximately 1 ppk/mol %. Based on ionic radius of Li+ (0.08 nm), Na+ (0.102 nm), and K+ (0.0138 nm), one mol % percent of Li+4 Na+ IOX causes about 60% growth when compared to one mol % percent of Na+→K+, therefore a value of 0.6 ppk/mol % Li+→Na+ was used for B. E was 83 GPa and v was 0.22. The measured stress profile in FIG. 4 for Example 1 shows a surface stress (measured relaxed stress ($\sigma_r$)) of about 115 MPa when ignoring the surface steep profile. Therefore, the stress relaxation in this example was about 60% (e.g., (300–115)/300).

The retained strength of the article of Example 1 was determined in a 4-point bending (4PB) after damage introduction by a surface impact test in accordance with the methods discussed above. In a first set of experiments, a first retained strength was determined relative to damage impact by 30 grit sandpaper. In a second independent set of experiments, a second retained strength was determined relative to damage impact by 80 grit sandpaper.

Figure 6:
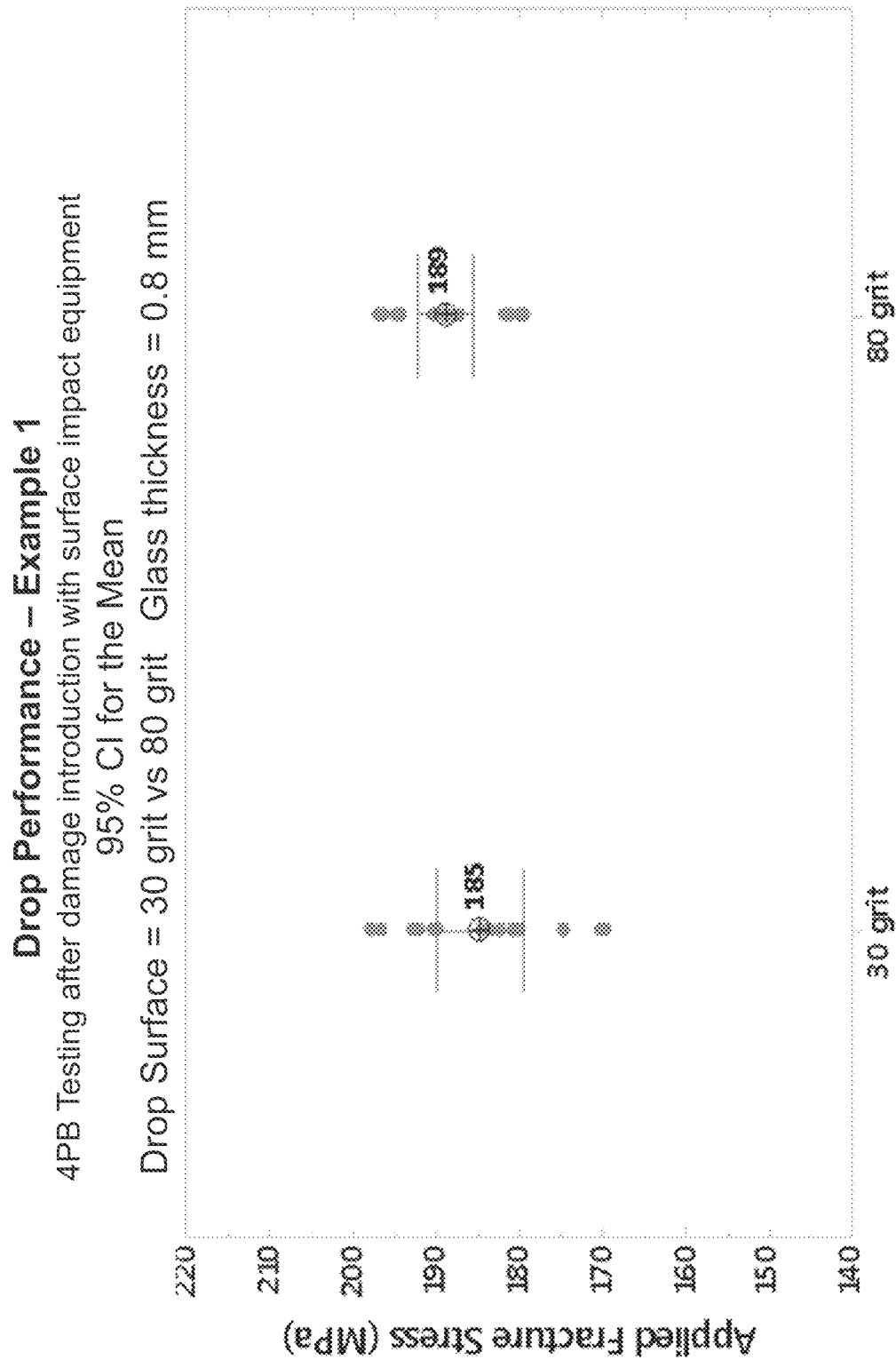
FIG. 6 is a plot of applied fracture stress (MPa) versus grit for an embodiment of a glass-based article.

FIG. 6 is a plot of applied fracture stress (MPa) versus grit for Example 1, where for 30 grit, the first retained strength averaged 185 MPa, and for 80 grit, the second retained strength averaged 189 MPa. 30 grit sandpaper generally introduces significantly deeper damage as compared to 80 grit sandpaper. For Example 1, it was unexpectedly found that the second retained strength after impact at 30 grit was statistically equivalent to (e.g., within 5 MPa of) the first retained strength after impact with 80 grit.

Example 3

Table 4 provides a summary of dual ion exchange (DIOX) conditions using nitrate salts of potassium (K) and sodium (Na), as noted, for Example 3. A substrate according to composition A having a thickness of 800 micrometers was used. The DIOX conditions included a preheat at 380° C. for 10 minutes. Also shown in Table 4 is data for: compressive stress (CS), knee depth of layer ($DOL_k$), and central tension (CT) after Step II. After Step I, CS as 540.0 MPa and $DOL_k$ was 6.50 μm. Both Step I and Step II included the addition of 0.5 wt. % silicic acid to the IOX bath. Between Step I and Step II, the substrate was cleaned to remove excess salt.

TABLE 4

| EXAMPLE | Substrate | DIOX Step I* | Step II* | CS (MPa) | $DOL_k$ (μm) | CT (MPa) | DOC (μm) |
|---|---|---|---|---|---|---|---|
| 3 | A | 60 wt % K/ 40 wt % Na, 450° C., 10hours | 100 wt % K 500° C., 45 minutes | 872.0 | 7.10 | 146 | 202 0.25 t |

*Each of Step I and Step II included the addition of 0.5 wt. % silicic acid.

Figure 7:
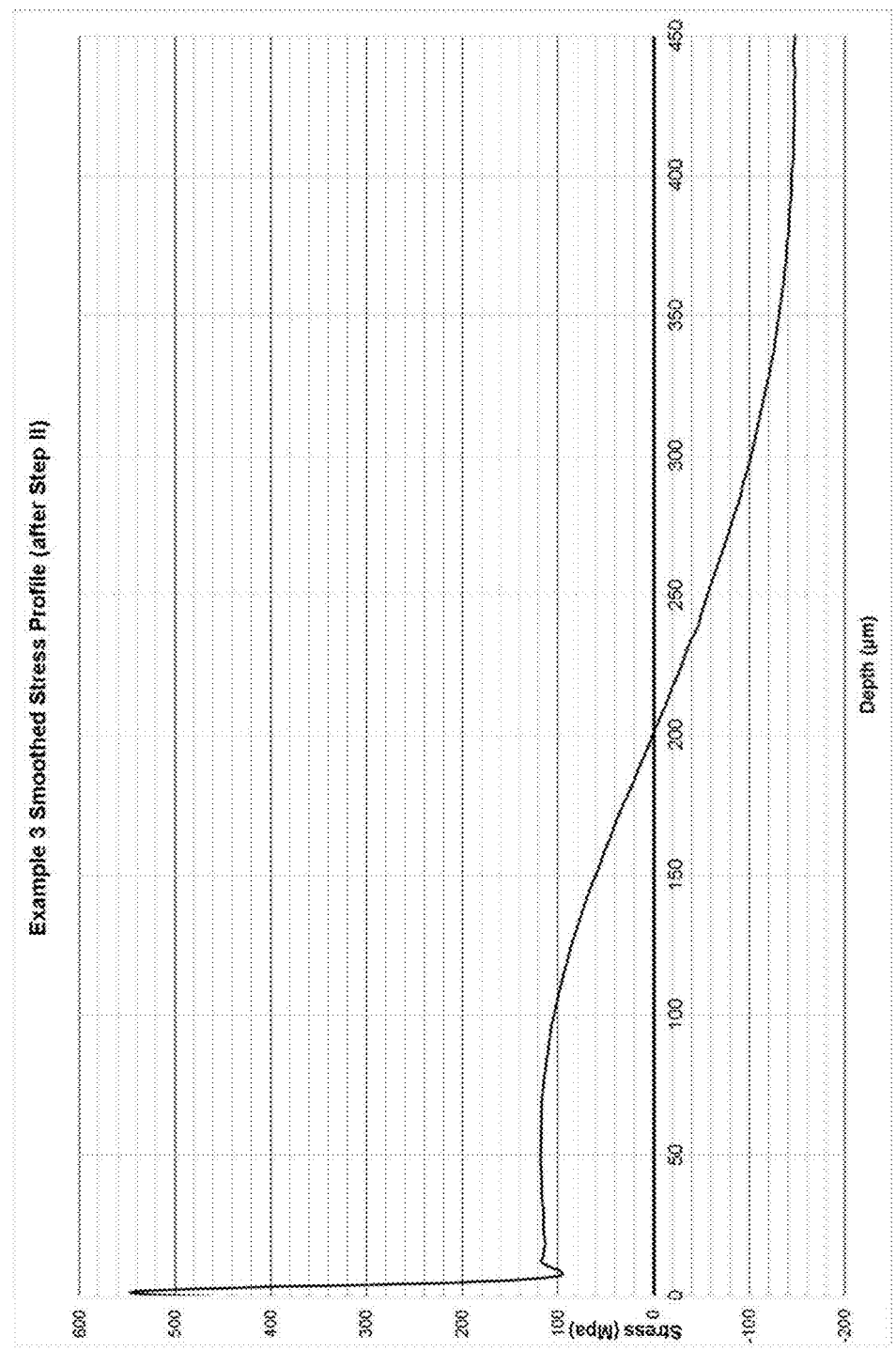
FIG. 7 is a plot of stress (MPa) versus depth (micrometers) from a surface for embodiments of a glass-based article and comparative examples.
Figure 8:
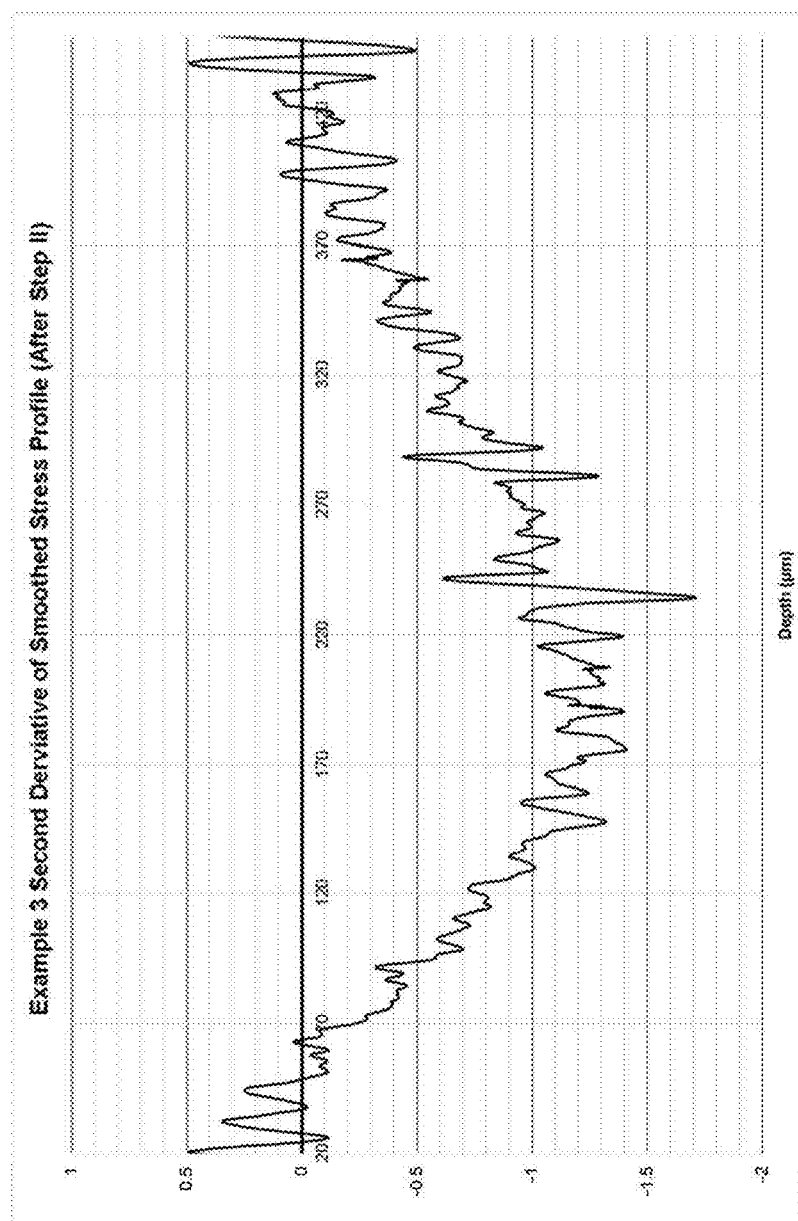
FIG. 8 is graph of the second derivative of the stress profile plot of FIG. 6.

FIG. 7 provides a smoothed stress profile (stress (MPa) versus depth (micrometers)) for Example 3 after Step II. In this example, in order to account for variability in measurements, the stress versus depth data was smoothed in accordance with the following equation: $y=9E-13x^6-1E-09x^5+6E-07x^4-0.0001x^3+0.0084x^2-0.0475x+113.15$; $R^2=0.9998$. FIG. 8 is a graph of the second derivative of the stress profile plot of FIG. 7. Starting at about a depth of 50 micrometers, the second derivative remains negative until about the center of the article (400 micrometers) with the exception of some positive values in the range of 63 to 64 micrometers. In the depth range from 50 micrometers to 202 micrometers (the DOC), the absolute value of the second derivative was in the range of 0.03 to 0.70.

Example 3 was annealed at 500° C. after DIOX. Table 5 provides the CT data.

TABLE 5

| EXAMPLE | Annealing time (minutes) | CT (MPa) |
|---|---|---|
| 3 | 20 | 125 |

Figure 9:
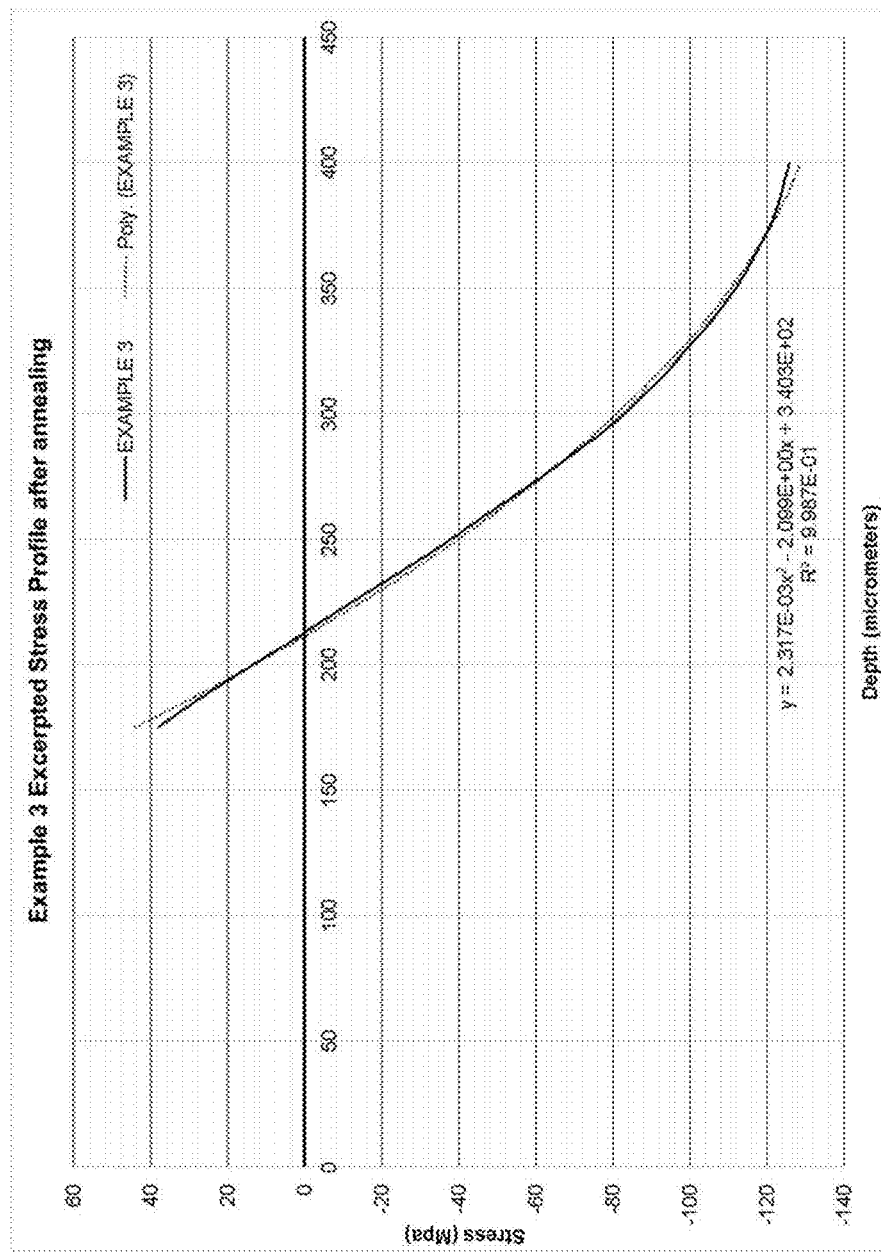
FIG. 9 is an excerpt of a stress profile according to embodiments of a glass-based article.

FIG. 9 is an excerpt of the stress profile for Example 3 after annealing to show the parabolic region being fit to the following equation:

Stress$(x)=2.317E-03x^2-2.099E+00x+3.403E+02$,
where $R^2=9.987E-01$.

Examples 5-8

The composition dependence of $T_g(x)$ and $m(x)$ of glass-based substrates are based on experimentally determined values and a range was evaluated using the modeling resulting from equations (1) to (7). For these examples, $T_g$ was in the range of 550° C. to 650° C. and fragility index was in the range of 25 to 35. $T_f$ was investigated in ranges such that: 30° C.$<T_f-T_g<$70° C. Table 6 provides a summary of the combinations.

TABLE 6

| EXAMPLE | $T_g$ (° C.) | m |
|---|---|---|
| 5 | 650 | 35 |
| 6 | 650 | 25 |
| 7 | 550 | 35 |
| 8 | 550 | 25 |

Stress relaxation rates at 1 hour for $T_{IOX}$ (IOX temperature) versus $T_f-T_g$ (e.g., the difference between $T_f$ and $T_g$) are plotted in FIGS. 10-13. The stress relaxation rates were calculated for the glass-based substrates according to Equation (1).

Figure 15:
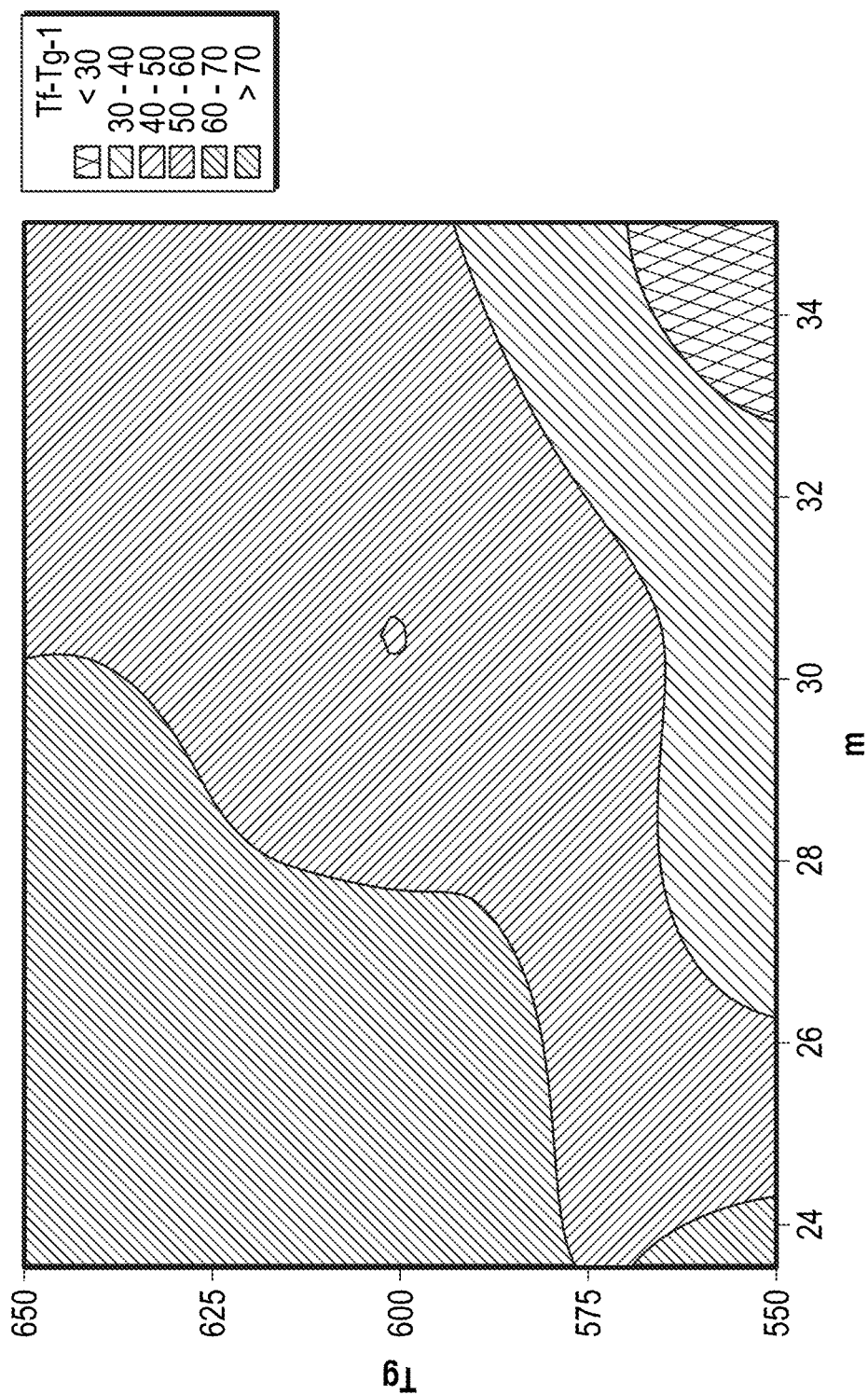
FIG. 15 is a plot of $T_g$, minimum fragility (m) and lowest $T_f$-$T_g$ to insure sufficient stress relaxation for $T_{IOX}$ of less than or equal to 500° C.

Stress relaxation rates of greater than or equal to 10%, for example, in the range of 20% to 80%, and all values and subranges therebetween, and IOX treatment temperature of below 550° C., including below 500° C., are desired. With respect to FIGS. 11-15, for a $T_{IOX}$ temperature being 500° C., a correlation between $T_g$, minimum fragility $m_m$ and minimum fictive temperature ($T_f-T_g$) can be determined, as shown in FIG. 15. For $T_{IOX}$ of less than or equal to 500° C. to achieve desired stress relaxation, a combination of $T_g$ of less than or equal to 650° C., the difference between $T_f$ and $T_g$ ($T_f-T_g$) of greater than or equal to 30° C., and m greater than or equal to 25 may be used as shown in Table 7 based on FIG. 15.

TABLE 7

| | $T_f - T_g$ | | | | |
|---|---|---|---|---|---|
| | 70 | 60 | 50 | 40 | 30 |
| Tg | Minimum m | | | | |
| 650 | 27.6 | 29.7 | 34.2 | >35 | >35 |
| 600 | 25.7 | 27.3 | 30.5 | >35 | >35 |
| 550 | 23.6 | 24.1 | 25.1 | 27.8 | 35.0 |

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

While the foregoing is directed to various embodiments, other and further embodiments of the disclosure may be devised without departing from the basic scope thereof, and the scope thereof is determined by the claims that follow. The features of the present disclosure may be combined in any and all combinations, for example as set forth in the following numbered embodiments.

Embodiment 1. A glass-based article comprising: a composition comprising a lithium-based aluminosilicate and a fracture toughness that is greater than or equal to 0.75 MPa*m$^{0.5}$; opposing first and second surfaces defining a thickness (t); and a stress profile comprising: a spike region extending from the first surface to a knee; and a tail region extending from the knee to a center of the glass-based article, the tail region comprising: a negative curvature region wherein a second derivative of stress as a function of depth is negative; a depth of compression (DOC) that is greater than or equal to 0.22t, and a parabolic region originating at the DOC and extending to the center of the glass-based article.

Embodiment 2. The glass-based article of embodiment 1, wherein the composition at a center of the glass-based article comprises a lithium oxide ($Li_2O$) content of greater than 8 mol %.

Embodiment 3. The glass-based article of embodiment 1 or 2, wherein the composition at a center of the glass-based article comprises a molar ratio of sodium oxide ($Na_2O$) to lithium oxide ($Li_2O$) of less than 1.0.

Embodiment 4. The glass-based article of the preceding embodiment, wherein the molar ratio of sodium oxide ($Na_2O$) to lithium oxide ($Li_2O$) is less than or equal to 0.63.

Embodiment 5. The glass-based article of embodiment 1, wherein the lithium-based aluminosilicate composition comprises potassium oxide ($K_2O$) and phosphorus pentoxide ($P_2O_5$) in an amount that is less than 2 mol % of the composition.

Embodiment 6. The glass-based article of embodiment 1, wherein the negative curvature region comprises an average compressive stress (CS) of greater than or equal to 50 MPa to less than or equal to 120 MPa.

Embodiment 7. The glass-based article of any of embodiment 1 to the preceding embodiment, wherein the composition at a center of the glass-based article comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$.

Embodiment 8. The glass-based article of any of embodiment 1 to the preceding embodiment, wherein the stress profile further comprises: a maximum compressive stress ($CS_{max}$) of greater than or equal to 150 MPa.

Embodiment 9. The glass-based article of any of embodiment 1 to the preceding embodiment, wherein the stress profile further comprises: a value of a peak central tension (CT)*thickness (t) in the parabolic region in the range of greater than or equal to 80 MPa to less than or equal to 160 MPa.

Embodiment 10. The glass-based article of any of embodiment 1 to the preceding embodiment, wherein the t is in the range of greater than or equal to 0.02 millimeters and less than or equal to 2 millimeters.

Embodiment 11. The glass-based article of any of embodiment 1 to the preceding embodiment further comprising an alkali metal present in a non-zero varying concentration extending from the first and/or second surface of the glass-based article to a depth of the glass-based article.

Embodiment 12. The glass-based article of the preceding embodiment, wherein the alkali metal is selected from the group consisting of: potassium (K), sodium (Na), lithium (Li), rubidium (Rb), cesium (Cs), francium (Fr), and combinations thereof.

Embodiment 13. The glass-based article of any of embodiment 1 to the preceding embodiment comprising a retained strength of greater than or equal to 170 MPa as measured for an article having a thickness of 600.0 μm after impact with 30 grit sandpaper with a force of 470.0 N.

Embodiment 14. The glass-based article of any of embodiment 1 to the preceding embodiment comprising a retained strength of greater than or equal to 170 MPa as measured for an article having a thickness of 600.0 μm after impact with 80 grit sandpaper with a force of 470.0 N.

Embodiment 15. A glass-based article comprising: opposing first and second surfaces defining a thickness (t); and a first retained strength of greater than or equal to 170 MPa as measured for an article having a thickness of 600.0 μm after impact with 30 grit sandpaper with a force of 470.0 N, and a second retained strength of greater than or equal to 170 MPa as measured for an article having a thickness of 600.0 μm after impact with 80 grit sandpaper with a force of 470.0 N.

Embodiment 16. The glass-based article of embodiment 15, wherein the first retained strength and the second retained strength are ±5 MPa.

Embodiment 17. The glass-based article of embodiment 15 comprising: a composition comprising a lithium-based aluminosilicate and a fracture toughness that is greater than or equal to 0.75 MPa*m$^{0.5}$.

Embodiment 18. The glass-based article of embodiment 15 comprising: a stress profile comprising: a spike region extending from the first surface to a knee; and a tail region extending from the knee to a center of the glass-based article, wherein the tail region comprises: a negative curvature region wherein a second derivative of stress as a function of depth is negative; a depth of compression (DOC) that is greater than or equal to 0.22t, and a parabolic region originating at the DOC and extending to the center of the glass-based article.

Embodiment 19. A consumer electronic product comprising: a housing having a front surface, a back surface, and side surfaces; electrical components provided at least partially within the housing, the electrical components including at least a controller, a memory, and a display, the display being provided at or adjacent the front surface of the housing; and a cover disposed over the display; wherein a portion of at least one of the housing and the cover comprises the glass-based article of any of embodiment 1 to the preceding embodiment.

Embodiment 20. A method of manufacturing a glass-based article comprising: exposing a glass-based substrate having opposing first and second surfaces defining a substrate thickness (t) and a lithium-based aluminosilicate composition to an ion exchange treatment comprising: a first molten salt bath and a second molten salt bath to form the glass-based article; wherein the glass-based article comprises: a fracture toughness that is greater than or equal to 0.75 MPa*m$^{0.5}$; and a stress profile comprising: a spike region extending from the first surface to a knee; and a tail region extending from the knee to a center of the glass-based article, the tail region comprising: a negative curvature region wherein a second derivative of stress as a function of depth is negative; a depth of compression (DOC) that is greater than or equal to 0.22t, and a parabolic region originating at the DOC and extending to the center of the glass-based article.

Embodiment 21. The method of the preceding embodiment further comprising an annealing step after the ion exchange treatment.

Embodiment 22. The method of embodiment 20, wherein the lithium-based aluminosilicate composition comprises a lithium oxide (Li$_2$O) content of greater than 8 mol %.

Embodiment 23. The method of embodiment 20, wherein the composition at a center of the glass-based article comprises a molar ratio of sodium oxide (Na$_2$O) to lithium oxide (Li$_2$O) of less than 1.0.

Embodiment 24. The method of the preceding embodiment, wherein the molar ratio of sodium oxide (Na$_2$O) to lithium oxide (Li$_2$O) is less than or equal to 0.63.

Embodiment 25. The method of embodiment 20, wherein the lithium-based aluminosilicate composition comprises potassium oxide (K$_2$O) and phosphorus pentoxide (P$_2$O$_5$) in an amount that is less than 2 mol % of the composition.

Embodiment 26. The method of embodiment 20, wherein the negative curvature region comprises an average compressive stress (CS) of greater than or equal to 50 MPa to less than or equal to 120 MPa.

Embodiment 27. The method of any of embodiments 20 to 26, wherein the composition comprises: 50 mol % to 69 mol % SiO$_2$; 12.5 mol % to 25 mol % Al$_2$O$_3$; 0 mol % to 8 mol % B$_2$O$_3$; greater than 0 mol % to 4 mol % CaO; greater than 0 mol % to 17.5 mol % MgO; 0.5 mol % to 8 mol % Na$_2$O; 0 mol % to 2.5 mol % La$_2$O$_3$; and greater than 8 mol % to 18 mol % Li$_2$O.

Embodiment 28. The method of any of embodiments 20 to 26, wherein the stress profile further comprises: a maximum compressive stress (CS$_{max}$) of greater than or equal to 150 MPa.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass-based article comprising:
    a composition comprising a lithium-based aluminosilicate and a fracture toughness that is greater than or equal to 0.75 MPa*m$^{0.5}$;
    opposing first and second surfaces defining a thickness (t); and
    a stress profile comprising:
        a spike region extending from the first surface to a knee; and
        a tail region extending from the knee to a center of the glass-based article, the tail region comprising:
            a first local maximum interior of the knee;
            a negative curvature region wherein a second derivative of stress as a function of depth is negative, the negative curvature region extending from the knee to an inflection point interior of the first local maximum, wherein the inflection point has a second derivative of stress as a function of depth equaling zero;
            a depth of compression (DOC) that is greater than or equal to 0.25t, and
            a parabolic region originating at the DOC and extending to the center of the glass-based article,
        wherein an average compressive stress (CS) of an entirety of the negative curvature region is greater than or equal to 50 MPa to less than or equal to 120 MPa; and
        wherein the stress profile further comprises: a value of a peak central tension (CT)* thickness (t) in the parabolic region in the range of greater than or equal to 80 MPa to less than or equal to 160 MPa.

2. The glass-based article of claim 1, wherein the composition at a center of the glass-based article comprises a lithium oxide (Li$_2$O) content of greater than 8 mol %.

3. The glass-based article of claim 1, wherein the composition at a center of the glass-based article comprises a molar ratio of sodium oxide (Na$_2$O) to lithium oxide (Li$_2$O) of less than 1.0.

4. The glass-based article of claim 1, wherein the lithium-based aluminosilicate composition comprises potassium oxide (K$_2$O) and phosphorus pentoxide (P$_2$O$_5$) in an amount that is less than 2 mol % of the composition.

5. The glass-based article of claim 1, wherein the composition at a center of the glass-based article comprises: 50 mol % to 69 mol % SiO$_2$; 12.5 mol % to 25 mol % Al$_2$O$_3$; 0 mol % to 8 mol % B$_2$O$_3$; greater than 0 mol % to 4 mol % CaO; greater than 0 mol % to 17.5 mol % MgO; 0.5 mol % to 8 mol % Na$_2$O; 0 mol % to 2.5 mol % La$_2$O$_3$; and greater than 8 mol % to 18 mol % Li$_2$O.

6. The glass-based article of claim 1, wherein the stress profile further comprises: a maximum compressive stress (CS$_{max}$) of greater than or equal to 150 MPa.

7. The glass-based article of claim 1, wherein the t is in the range of greater than or equal to 0.02 millimeters and less than or equal to 2 millimeters.

8. The glass-based article of claim 1 further comprising an alkali metal oxide present in a non-zero varying concentration extending from the first and/or second surface of the glass-based article to a depth of the glass-based article.

9. The glass-based article of claim 1 comprising a retained strength of greater than or equal to 170 MPa as measured for an article having a thickness of 600.0 μm after impact with 30 grit sandpaper with a force of 470.0 N.

10. The glass-based article of claim 1 comprising a retained strength of greater than or equal to 170 MPa as measured for an article having a thickness of 600.0 μm after impact with 80 grit sandpaper with a force of 470.0 N.

11. A consumer electronic product comprising:
    a housing having a front surface, a back surface, and side surfaces;
    electrical components provided at least partially within the housing, the electrical components including at least a controller, a memory, and a display, the display being provided at or adjacent the front surface of the housing; and
    a cover disposed over the display;
    wherein a portion of at least one of the housing and the cover comprises the glass-based article of claim 1.

* * * * *